United States Patent
McEvilly et al.

(10) Patent No.: US 12,167,264 B1
(45) Date of Patent: Dec. 10, 2024

(54) FORWARD-LOOKING MOBILE NETWORK PERFORMANCE VISIBILITY VIA INTELLIGENT APPLICATION PROGRAMMING INTERFACES

(71) Applicant: Amazon Technologies, Inc., Seattle, WA (US)

(72) Inventors: Christopher McEvilly, Bagshot (GB); Benjamin Franco Reza Lavasani, Thatcham (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/710,387

(22) Filed: Mar. 31, 2022

(51) Int. Cl.
*H04W 24/08* (2009.01)
*H04L 41/16* (2022.01)
*H04L 43/087* (2022.01)
*H04L 43/0876* (2022.01)
*H04W 24/02* (2009.01)

(52) U.S. Cl.
CPC ............. *H04W 24/08* (2013.01); *H04L 41/16* (2013.01); *H04L 43/087* (2013.01); *H04L 43/0876* (2013.01); *H04W 24/02* (2013.01)

(58) Field of Classification Search
CPC ...... H04W 24/08; H04W 24/02; H04L 41/16; H04L 43/0876
See application file for complete search history.

(56) References Cited

U.S. PATENT DOCUMENTS

| | | | |
|---|---|---|---|
| 2014/0242916 A1* | 8/2014 | Bellamkonda | H04L 47/11 455/67.11 |
| 2019/0140933 A1* | 5/2019 | Guim Bernat | H04L 47/2425 |
| 2020/0015121 A1* | 1/2020 | Misra | H04W 28/0231 |
| 2020/0344641 A1* | 10/2020 | Veggalam | H04W 28/0284 |
| 2020/0351173 A1* | 11/2020 | Vasseur | H04L 41/145 |
| 2021/0410035 A1* | 12/2021 | Yang | H04W 24/02 |
| 2022/0022066 A1* | 1/2022 | Anand Pushkala | H04W 24/08 |
| 2022/0124560 A1* | 4/2022 | Yeh | H04L 41/5054 |
| 2022/0209874 A1* | 6/2022 | Svennebring | H04W 64/006 |
| 2022/0303331 A1* | 9/2022 | Svennebring | H04N 21/8456 |

OTHER PUBLICATIONS

Machine-Learning-Based Uplink Throughput Prediction (Year: 2022).*

* cited by examiner

*Primary Examiner* — Clayton R Williams
(74) *Attorney, Agent, or Firm* — Perilla Knox & Hildebrandt LLP; Thomas B. Hildebrandt

(57) ABSTRACT

Techniques for providing forward-looking mobile network performance visibility via an intelligent application programming interface are described. Network performance metadata associated with a wireless network of a communications service provider is obtained and stored in a data lake. One or more machine learning models are trained based on use of the wireless network performance metadata. The one or more machine learning models, or predictions such as forecasts generated via use of the models, are used to service requests received at a cloud provider network seeking forward-looking performance characteristics of the wireless network.

20 Claims, 13 Drawing Sheets

FORWARD-LOOKING MOBILE NETWORK PERFORMANCE VISIBILITY VIA INTELLIGENT APPLICATION PROGRAMMING INTERFACES

BACKGROUND

Cloud computing environments often provide on-demand, managed computing resources to customers. Such computing resources (e.g., compute and storage capacity) are often provisioned from large pools of capacity installed in data centers. Customers can request computing resources from the "cloud," and the cloud can provision compute resources to those customers. Technologies such as virtual machines and containers are often used to allow customers to securely share capacity of computer systems.

While customers often utilize computing resources within a region of a multi-tenant cloud provider network, in some scenarios, application developers may also want to utilize "edge locations" of a cloud provider network that are located more closely to end users in order to provide lower-latency interactions with their users. However, utilizing edge locations effectively can be very difficult.

BRIEF DESCRIPTION OF DRAWINGS

Various examples in accordance with the present disclosure will be described with reference to the drawings, in which.

DETAILED DESCRIPTION

Figure 1:
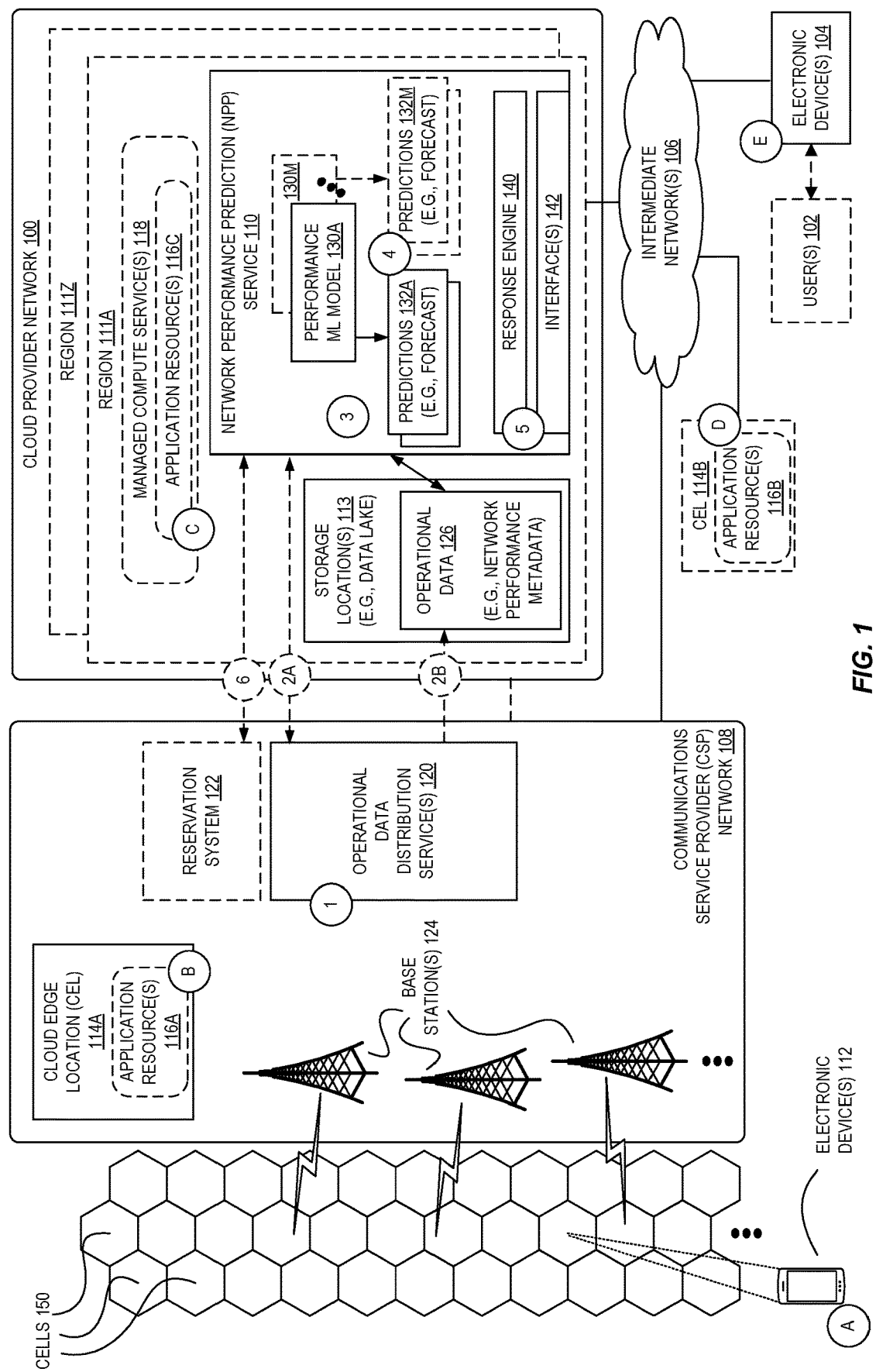
FIG. 1 is a diagram illustrating an environment for providing forward-looking mobile network performance visibility via an intelligent application programming interface according to some examples.

The present disclosure relates to methods, apparatus, systems, and non-transitory computer-readable storage media for a cloud provider network-based service to provide intelligent, highly accurate visibility into current and/or upcoming network performance characteristics to allow users to improve the performance of applications provided via these networks, e.g., by modifying the performance of their applications or delivery of service based on predicted upcoming operational characteristics of these networks.

Currently, communications service providers (CSPs) (e.g., "mobile" providers that provide network connectivity via cellular networks, such as 5G service or similar) are contemplating providing metadata describing their quality of service to application developers and other systems to allow application or system developers to tailor their service based on cell conditions and network performance. One such contemplated system would expose near real-time visibility into network connections via the CSP offering an Application Programming Interface (API) allowing users to effectively "query" the CSP for particular types of information.

However, such APIs will fundamentally provide "out of date" information as network cell conditions can change in microseconds, and such APIs will take milliseconds (or typically much longer) at best to provide the data. Further, reported data can be incorrect due to the cell behavior as connections can have different network QoE/QoS (quality of experience, quality of service) settings, e.g., via different network slices, and further the existing of user equipment (UE) device handover from one access point (e.g., network tower) to another may impact the data being provided and/or the usefulness of data that is provided. Thus, metadata reporting on cell conditions such as congestion, available bandwidth, and latency in near real time can be useful data but may more importantly be misleading for many users, especially as a UE device can connect to multiple cells from a cell boundary or need data in time to be meaningful for their service.

According to some examples, a network performance prediction (NPP) service implemented in a cloud provider network can obtain network operational data such as wireless network performance metadata associated with a wireless network of a communications service provider, such as latency information, bandwidth information, jitter information, etc., associated with various cells of the network at various points of time. This data can be stored as part of a data lake, for example, and used to train one or more machine learning (ML) models. Optionally, other network-related data can additionally or alternatively be used as part of training ones of the ML models, e.g., by utilizing data collected via performing real-world tests of the mobile network's performance using devices in the field, via third party monitoring tools, via data collected from applications themselves, etc. The NPP service can then utilize these ML models to provide an effective "digital twin" of the wireless network by forward-predicting wireless network cell conditions for different users in different locations with a high degree of accuracy, and exposing this data to users—such as to mobile devices seeking to interact with applications using these networks, or to applications themselves that may provide services to various clients using these networks—via a simple set of interfaces, such as web-based application programming interfaces (APIs) commonly used throughout the computing landscape. Accordingly, various examples described herein can provide future-looking performance data allowing users to understand performance characteristics for specific locations (e.g., cells) and/or for specific network slices for the near future, avoiding the "staleness" problem of a real-time approach. Moreover, some examples can provide flexible, customizable access to this data via a simple set of easily utilized APIs.

In some examples, the NPP service can abstract operational data such as network performance data (e.g., specific cell conditions) to a more usable format that provides a mapping to a UE's location, and/or even a mobility map if it is requested. For example, via use of the ML models, the NPP service can provide an abstracted view of the user's network performance for a given location regardless of cell boundaries.

In some examples, the NPP service can also provide predictive information with further intelligence based on rules provided by the CSP itself, e.g., where the CSP can provide logic or rules that allows for even more accurate results to be provided than that of the ML models alone. Further, in some examples, NPP service can also interact with the CSP, based on a particular request of a user, to determine whether a particular desired service (e.g., a particular quality of connection during a particular range of times at a particular location) can be provided to the user and/or to actually reserve such a connection, e.g., via the CSP allocating resources for that user.

FIG. 1 is a diagram illustrating an environment for providing mobile network performance visibility via an intelligent application programming interface according to some examples. In FIG. 1, a network performance prediction (NPP) service 110 of a cloud provider network 100 includes one or more performance machine learning (ML) models 130A-130M, predictions 132A-132M, a response engine 140, and one or more interfaces 142. Some or all of NPP service 110 may be implemented using software executed by one or multiple computing devices across one or multiple locations and may utilize other services of the provider network 100 for implementing components and performing operations. For example, the NPP service 110 can be implemented as a software application that is executed by one or more compute instances provided by a managed compute service such as a hardware virtualization service or on-demand code execution service, can utilize a ML training and/or hosting service or a forecasting service of the provider network to train and/or utilize the ML model(s) 130 or generate predictions 132, and/or make use of one or more data storage locations 113 provided by a storage virtualization service (e.g., providing block-level storage or object storage) or a database service to store operational data 126.

As described herein, some computing applications may be deployed via a cloud provider network 100, e.g., as application resources (such as application code, data, libraries, virtual machines, databases, services, microservices, and the like) in one or multiple types of environments. For example, a set of application resources 116A can be deployed in one or multiple cloud edge locations 114A-114B and/or in one or more regions 111A-111Z of a cloud provider network 100, such as by deploying certain applications 116C via the use of managed compute services 118.

In some examples, segments of a cloud provider network—referred to herein as a cloud edge location ("CEL") (or more simply an edge location ("EL") or provider substrate extension ("PSE"))—can be provisioned within a network (e.g., a network 108 of a communications service provider ("CSP")) that is independent from the cloud provider network 100. A cloud provider network typically includes a physical network (e.g., sheet metal boxes, cables, rack hardware) referred to as the substrate. The substrate can be considered as a network fabric containing the physical hardware that runs the services of the provider network. In some implementations, a cloud edge location may be a provider substrate "extension" acting as an extension of the cloud provider network substrate formed by one or more servers located on-premise in a customer or partner facility, at a separate cloud provider-managed facility, at a CSP facility, or other facility including servers wherein such server(s) communicate over a network (e.g., a publicly-accessible network such as the Internet) with a nearby availability zone or region of the cloud provider network. In some examples, users may access a cloud edge location via the cloud provider substrate or another network and may use the same application programming interfaces (APIs) to create and manage resources in the cloud edge location as they would use to create and manage resources in the region of a cloud provider network.

As indicated above, one example type of CEL is one that is formed by servers located on-premise in a customer or partner facility. This type of CEL located outside of cloud provider network data centers can be referred to as an "outpost" of the cloud provider network. Another example type of cloud edge location, e.g., CEL 114B, is one that is formed by servers located in a facility managed by the cloud provider but that includes data plane capacity controlled at least partly by a remote/distinct control plane of the cloud provider network, which in some settings may commonly be referred to as a "local zone."

Another type of CEL, e.g., CEL 114A, is deployed within a communications service provider's network 108, which may be referred to as a "wavelength zone." CSPs generally include companies that have deployed networks through which end users obtain network connectivity. For example, CSPs can include mobile or cellular network providers (e.g., operating 3G, 4G, and/or 5G networks), wired internet service providers (e.g., cable, digital subscriber lines, fiber, etc.), and WiFi providers (e.g., at locations such as hotels, coffee shops, airports, etc.). While traditional deployments of computing resources in data centers provide various benefits due to centralization, physical constraints such as the network distance and number of network hops between end user devices and those computing resources can prevent very low latencies from being achieved. By installing or deploying capacity within CSP networks, the cloud provider network operator can provide computing resources with dramatically lower access latency to end user devices—in some cases to single-digit millisecond latency. Such low latency access to compute resources is an important enabler to provide improved responsivity for existing cloud-based applications and to enable the next generation of applications for game streaming, virtual reality, real-time rendering, industrial automation, autonomous vehicles, and other yet-to-be created use cases.

Users of cloud provider networks then, have multiple choices for deploying application resources 116 such as code, compute instances, or the like, such as application resources 116A deployed within one or multiple CELs 114A of one or multiple CSP networks 108 (e.g., of a single CSP or multiple CSPs), which may be in different geographic areas. Additionally, or alternatively, a user may deploy application resources 116B in a separate CEL 114B such as a "local zone" or "outpost" of the cloud provider network 100, and/or within one or more AZs of one or more regions 111 of the cloud provider network 100.

In the case of use of CELs 114A in CSP networks 108, these deployments may be particularly sensitive to the latency between the application resources and its end users (or clients, such as mobile phones, tablets, vehicles, etc.). Notably, the locations of an end user may change over time (e.g., move between cells 150, between different base stations 124 via handovers, etc.), or the locations of an application's users may change over time (e.g., from one country or region to another country or region based on time of day). Further, some end users may be in locations that have changing network performance capabilities, whether it is due to system congestion, weather, etc., and thus some types of service (or "slices") or all types of service at a particular location (such as the area within a cell 150) may be affected.

Thus, based on any of a variety of factors, a user may seek to deploy their application resources 116 in different locations over time to provide the best possible application performance, change the configuration of their application resources 116 (or of client code executed by end user electronic devices 112) based on network conditions, or the like based on cell conditions and network performance.

To aid in this decision-making, users may seek information about the network performance or characteristics of the various networks or network slices offered by the CSP network(s) 108 from various locations. One such technique could be to request such performance data direct from the CSP, which could occur via an exposed API allowing the user (e.g., a developer or system manager) to obtain current operating characteristics, e.g., based on 3GPP standards.

However, as indicated earlier herein, such APIs will in many cases provide out of date information as the cell conditions can change extremely rapidly (e.g., in microseconds) and the request and response of API will take much longer than that at best to provide the requested data. Further, this data—which may typically be reflected on a cellular basis—can be incorrect as different connections at a particular location can have different network QoE settings (network slices) and user equipment handover. Thus, reporting on cell 150 conditions such as congestion, available bandwidth, latency, etc., in near real time can be generally useful but is often misleading for many users, as it may not reflect the actual conditions of particular types of users, and that the conditions may rapidly change such that obtained data is out-of-date in an instant.

Accordingly, as disclosed herein, examples can obtain network performance data in the form of performance metrics and use this information as a "digital twin" of the CSP network 108, allowing for high-quality predictions 132 of mobile network performance to be generated for the near future, allowing users to more accurately understand network conditions at one or multiple locations and react accordingly, e.g., by deploying, removing, or moving application resources from one CEL 114 to another, causing client electronic devices 112 to utilize different network slices or connect via different (e.g., adjacent) base stations 124, by obtaining reserved connectivity services from a CSP, or the like.

For example, as reflected in FIG. 1 at circle (1), a operational data distribution service 120 of a CSP network 108 obtains operational information such as network performance information corresponding to its offered services in the form of operational data 126 (e.g., performance metrics). For example, in a 5G type architecture, the operational data distribution service 120 may be implemented within a control plane of the mobile network, such as being part of or communicatively coupled with an Application Function (AF) and/or other control plane network function such as a Policy Control Function (PCF), Session Management Function (SMF), Access and Mobility Management Function (AMF), Unified Data Management (UDM) function, Authentication Server Function (AUSF), Network Slice Selection Function (NSSF), or the like.

In some examples, the operational data (e.g., network performance metadata) may be provided via a well-defined set of APIs, which may or may not be offered generally to other users, and as reflected by circle (2A), the NPP service 110 may periodically send requests for this information and receive a response that carries the information, which may optionally be processed (e.g., normalized) by the NPP service 110 and stored at one or more storage locations 113 (e.g., implementing a data lake) as operational data 126. Alternatively, or additionally, the operational data distribution service 120 may be configured (e.g., by request of the NPP service 110) to transmit updates to operational data 126 on its own as shown by circle (2B), e.g., on a regular basis or event-driven basis.

Generally, operational data describes or quantifies the operation of the associated network, and may be network performance type information (e.g., reflecting network metrics), mobility type information, congestion type information, etc. Thus, the utilized types of operational data can vary based on the particular implementation, though could include information specific to particular locations (e.g., cells, geocoordinates, or the like) at a particular point in time or range of times, such as one or more of a congestion amount value, a load amount value (e.g., a percentage or raw utilization), an available or total or used bandwidth amount, a latency value indicating a maximum, mean, median, and/or minimum latency between the CSP network and clients at a location, a jitter value indicating a maximum, mean, median, and/or minimum of jitter between the CSP network and clients at a location, network slice availability information describing available slices and/or the utilization thereof, a reliability score, a coverage description, a connection count, a user count amount, etc.

In some examples, the NPP service 110 can update the operational data 126 to make it more suitable for further use. For example, the NPP service 110 can remove unnecessary data, transform particular values into others (e.g., bucketize values into categories), supplement the data with additional data (e.g., obtained from another source, such as a third-party service or distributed network testing system described herein), or generally "normalize" some or all of the data, e.g., so that operational data 126 from separate CSPs is represented in a consistent format.

With the obtained operational data 126, at circle (3) the NPP service 110 can train one or multiple different machine learning (ML) models 130A-130M to generate predictions for ones of types of the operational data (e.g., performance metrics), e.g., for a particular location, time of day (and/or date). In some examples, a single type of performance metric may be used to train a single ML model (or ensembled thereof) to generate predictions for that particular performance metric, and this can be replicated for different ones of the operational data 126, resulting in multiple performance ML models 130A-130M. However, in some examples a single performance ML model 130A can be trained using multiple different operational data 126 values as input, where the output (or "predicted" or "inferred" value) may be one of these performance metrics or an entirely different value altogether. The particular type(s) of ML algorithms involved can be varied based on the particular implementation (e.g., neural networks, K-Means type algorithms, XGBoost algorithms, or the like), though could include binary classification models (e.g., yielding a yes/no result, such as a value indicating whether a cell has at least a particular amount of bandwidth available or not), multi-class classification models (e.g., identifying a particular class from a set of multiple possible classes, such as a congestion level from several possible levels), regression models (e.g., predicting a numeric value, such as a latency amount, jitter, bandwidth, or the like), a time-series forecasting model. The particular model algorithms may also vary, and may utilize a machine learning framework or toolkit such as Gluon, Keras, MXNet, PyTorch, TensorFlow, TensorFlow-Lite, ONNX, etc.

In some examples, the training (and subsequent hosting/use) of a particular model may include the NPP service 110 sending commands to a machine learning service of the provider network 100 (e.g., AWS SageMaker), which can be a fully managed machine learning service where developers can quickly and easily build and train machine learning models, and then directly deploy them into a production-ready hosted environment. Such a machine learning service can provide an integrated Jupyter authoring notebook instance for easy access to data sources for exploration and analysis, provide common machine learning algorithms that are optimized to run efficiently against extremely large data in a distributed environment, and/or provide native support for bring-your-own-algorithms and frameworks to provide flexible distributed training options that adjust to specific workflows. In some examples, the machine learning service can be used (e.g., by the NPP service 110 sending one or more commands) to deploy a model into a secure and scalable environment by a simple launch path, which then can be used (e.g., with data from a particular request) to generate one or more predictions 132A-132M.

Alternatively, or additionally, in some examples the NPP service 110 may make use of a time-series forecasting service (e.g., Amazon Forecast) that can obtain the operational data 126, analyze the operational data 126, and utilize one or more ML models 130 to yield one or more forecasts as the one or more predictions 132A-132M.

Accordingly, various clients can then send requests—according to one or multiple APIs exposed by the NPP service 110 (e.g., RESTful APIs)—to obtain predictive network performance or operational data, e.g., an indication of congestion at a location, a bandwidth availability amount at a location, whether a network slice is available at a location for reservation, an indication of an optimal QoS that is likely to be available, etc. These clients may include, at circle (A), a UE electronic device 112 such as a mobile phone seeking to identify which base station 124 it should connect to (in the event of multiple candidates), which level of service it should attempt to use (e.g., what type of connection, what quality of video to download), etc. The UE electronic device 112 may thus send a request for this data, and may provide data such as a location of the UE electronic device 112, a network address of the UE electronic device 112, a requested type of performance metric to be obtained (e.g., latency), identifiers of one or more cells or base stations it can operate in or will operate in, etc.

As another example, the client may be an application resource component 116A in a CEL 114A at circle (B), an application resource component 116B in another type of CEL 114B at circle (D), or even an application resource component 116C in a region 111 of the cloud provider network 100 at circle (C), any of which may seek performance information about its clients (e.g., UE electronic devices 112), about the performance the CSP network can provide to nearby cells or locations, etc., which could in some examples cause the application resource 116A to change how the application is deployed, e.g., by launching additional application resources in other locations, halting certain application resources, sending commands to its clients to access the application differently, etc.

As yet another example, the client may be a user 102 (such as an application developer) using an electronic device 104 at circle (E) to explore mobile network performance characteristics to monitor and make decisions for an application, e.g., to detect current and upcoming issues and change the deployment of application resources accordingly.

Thus, these clients may submit requests (e.g., via web service type API calls) to the NPP service 110 including various parameters (e.g., requested types of metrics, desired time frames of interest, types of network slices involved or desired, locations, CSP networks of interest, etc.) via one or more interfaces 142 of the NPP service 110 at circle (5) that are provided to a response engine 140 that can either directly use one or more performance ML models 130A-130M to generate predictions and assemble responses based on those predictions, or indirectly use the performance ML models 130A-130M by use of existing predictions 132A-132M (e.g., existing ranges of time-series type predictions associated with one or typically multiple upcoming points in time) earlier generated via the performance ML models 130A-130M. Thus, based on these predictions 132A-132M, the response engine can generate a response, e.g., values for particular requested network performance characteristics (e.g., latency and jitter) for a particular location (or set of locations) for one or more upcoming times, such as a value for each second of the next three-hundred seconds, each millisecond for the next ten seconds, each minute for the next hour, each five-minute window for the next hour, or the like. As another example, the response may indicate or identify a particular network slice that should be used for communications (e.g., based on a profile associated with the application and/or UE devices), or the response may serve as a "rejection" in that it can provide an indication that a particular type of network access (e.g., a particular network slice or service) for a particular user and/or location is likely to be unavailable due to capacity constraints, etc.

In some examples, the generation of the responses by the response engine 140 may be further controlled or governed using rules. For example, in some cases a CSP may provide rules or logic that is applicable to all or some response types, such as a maximum available bandwidth that is actually available in a particular cell (e.g., a total of 10 gigabytes/second can be used in a particular cell at any point in time), allowing the response engine to give predictions that do not violate actual constraints that may exist. Thus, the response engine 140 may obtain predictions necessary for a particular request, validate and/or modify these predictions based on the rules, and return the processed values as the responses. Other types of rules may similarly be put in place, whether it is by the cloud provider network 100 or by the user 102 (or another user of a same organization as the user, such as a manager).

In some examples, the NPP service 110 may also interact more specifically with the CSP as part of this process. For example, as shown by circle (6), in some cases a client may seek information about a particular type of service that is desired in a particular location (e.g., a request seeking information about bandwidth in a particular cell at a particular time), and the NPP service 110 may directly interact with a reservation system 122 of the CSP network 108 to verify that such service will or will not available. Further the NPP service 110 may seek to request that a particular connectivity or network resource be made available for a particular user as a reservation, thus allowing users to obtain needed network resources quickly and easily from a CSP without having to directly interact with the CSP itself. As an example, a user may send a request seeking a particular network slice (e.g., a particular quality of service of a particular connection type) at a particular location for a particular range of time, and the NPP service 110 may optionally predict whether it is available and/or can send a request on to the CSP reservation system 122 to reserve such a slice.

Figure 2:
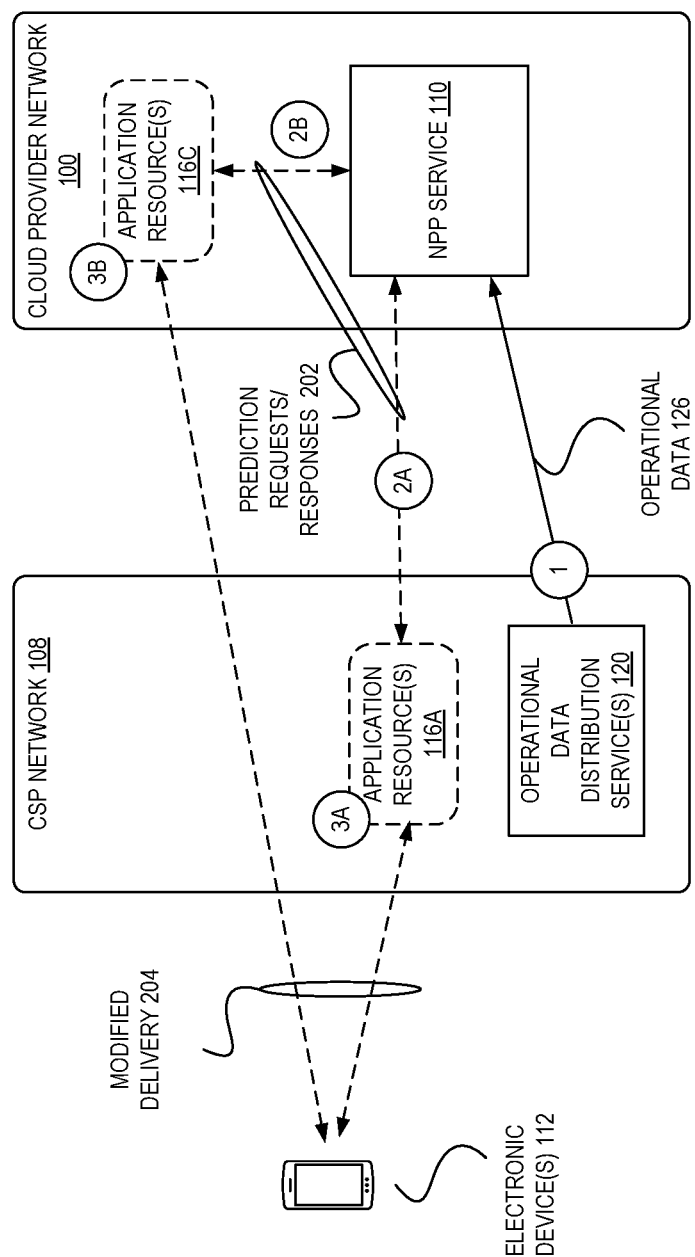
FIG. 2 is a high-level diagram illustrating a simplified environment for utilizing forward-looking mobile network performance visibility via an intelligent application programming interface according to some examples.

FIG. 2 is a high-level diagram illustrating a simplified environment 200 for utilizing forward-looking mobile network performance visibility via an intelligent application programming interface according to some examples. In this simplified figure utilizing the techniques and systems disclosed herein, an application can self-adapt itself to modify how it provides service to one or more (consumer) electronic devices 112 that access the application (e.g., application resources 116A deployed in a "wavelength zone" of a CSP network 108 and/or application resources 116C deployed in a region of the cloud provider network 100) via use of a CSP network 108. In this example, the operational data distribution service 120 at circle (1) provides operational data 126 to the NPP service 110 (e.g., directly to the NPP service, which may then store the data in a data lake, object store, database, etc., or indirectly to the NPP service by storing the data in a storage location accessible to the NPP service 110), which uses this data to train and/or retrain one or more ML models. Thereafter, via a set of one or more interfaces, the application resources 116A and/or application resources 116C may send a request for a prediction (and receive a response thereto) 202 regarding the operation of the CSP network 108 (e.g., for a particular location or UE device) at circles (2A) and/or (2B). Based on an analysis of the predictions provided in the prediction responses, the application (e.g., via application resources 116A and/or application resources 116C) may or may not modify its service delivery 204 at circles (3A) and/or (3B) to one or more of the electronic devices 112, such as by modifying a multimedia manifest (e.g., for a streaming video) to cause the electronic device(s) 112 to request a different (e.g., higher or lower data rate) media segment, or by generating a different quality of stream (e.g., for an AR/VR application) to be provided to the electronic device(s) 112.

Figure 3:
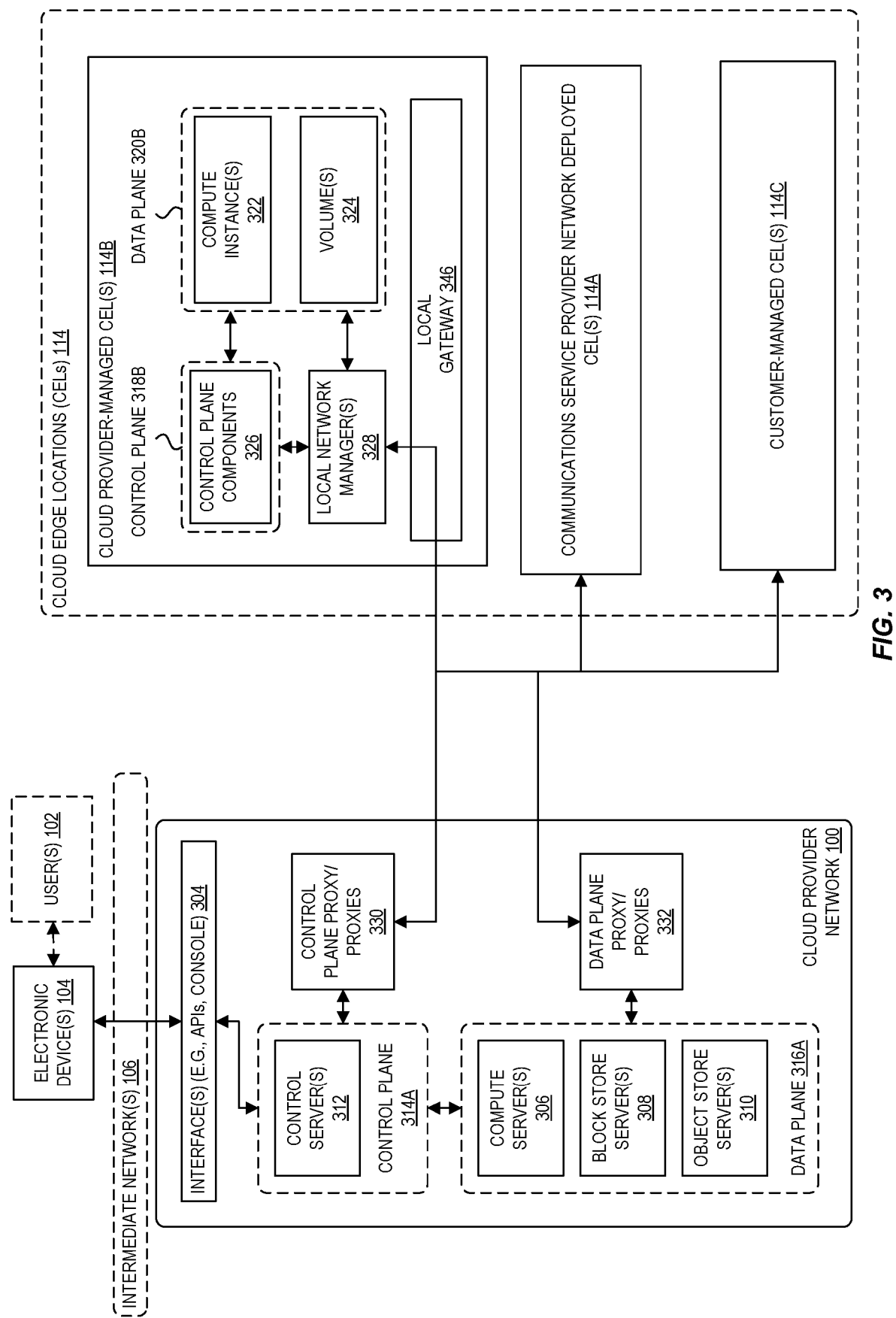
FIG. 3 illustrates an exemplary system including cloud edge locations at which computing resources can be deployed by customers of a provider network according to some examples.

For further detail regarding cloud edge locations, FIG. 3 illustrates an exemplary system including cloud edge locations at which computing resources can be deployed by customers of a provider network according to some examples. A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 100 can provide on-demand, scalable computing services to users through a network 106, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, application programming interface (API), software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

As indicated above, users 102 can connect to virtualized computing devices and other cloud provider network 100 resources and services using various interfaces (e.g., APIs) via intermediate network(s) 106 such as the Internet. An API refers to an interface and/or communication protocol between a client (e.g., software executed by an electronic device 104) and a server, such that if the client makes a request in a predefined format, the client should receive a response in a specific format or cause a defined action to be initiated. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. Users can choose to deploy their virtual computing systems to provide network-based services for their own use and/or for use by their customers or clients.

The cloud provider network 100 can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network 100, for example it may not be possible to route from a substrate network address to an address in a production network that runs services of the cloud provider, or to a customer network that hosts customer resources.

The cloud provider network 100 can also include an overlay network of virtualized computing resources that run on the substrate. In at least some examples, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server 306, a block store server 308, an object store server 310, a control server 312) can have an IP address in the substrate network. Hardware virtualization technology can enable multiple operating systems to run concurrently on a host computer, for example as virtual machines (VMs) on a compute server 306. A hypervisor, or virtual machine monitor (VMM), on a host allocates the host's hardware resources amongst various VMs on the host and monitors the execution of VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network 100. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

To provide computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code-typically without the user having any control of or knowledge of the underlying compute instance(s) involved.

For example, cloud provider networks 100 may provide managed compute services 118 allowing users to execute applications. One such managed compute service 118 can be an on-demand code execution service that executes serverless functions. In various examples, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function.

A serverless function may be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources may be maintained in a "ready" state (e.g., having a pre-initialized runtime environment configured to execute the serverless functions), allowing the serverless functions to be executed in near real-time. Thus, an on-demand code execution service (referred to in various examples as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code.

Another managed compute service 118 that may be offered can be a hardware virtualization service (referred to in various implementations as an elastic compute service, a virtual machines service, a computing cloud service, a compute engine, or a cloud compute service) that can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another possible managed compute service 118 can be a container service such as a container orchestration and management service (referred to in various implementations as a container service, cloud container service, container engine, or container cloud service) that allows users of the cloud provider network to instantiate and manage containers. In some examples a container service may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As illustrated, the traffic and operations of the cloud provider network substrate may broadly be subdivided into two categories in various examples: control plane traffic carried over a logical control plane 314A and data plane operations carried over a logical data plane 316A. While the data plane 316A represents the movement of user data through the distributed computing system, the control plane 314A represents the movement of control signals through the distributed computing system. The control plane 314A generally includes one or more control plane components or services distributed across and implemented by one or more control servers 312. Control plane traffic generally includes administrative operations, such as establishing isolated virtual networks for various customers, monitoring resource usage and health, identifying a particular host or server at which a requested compute instance is to be launched, provisioning additional hardware as needed, and so on. The data plane 316A includes customer resources that are implemented on the cloud provider network (e.g., computing instances, containers, block storage volumes, databases, file storage). Data plane traffic generally includes non-administrative operations such as transferring data to and from the customer resources.

The control plane components are typically implemented on a separate set of servers from the data plane servers, and control plane traffic and data plane traffic may be sent over separate/distinct networks. In some examples, control plane traffic and data plane traffic can be supported by different protocols. In some examples, messages (e.g., packets) sent over the cloud provider network 100 include a flag to indicate whether the traffic is control plane traffic or data plane traffic. In some examples, the payload of traffic may be inspected to determine its type (e.g., whether control or data plane). Other techniques for distinguishing traffic types are possible.

As illustrated, the data plane 316A can include one or more compute servers 306, which may be bare metal (e.g., single tenant) or may be virtualized by a hypervisor to run multiple VMs (sometimes referred to as "instances") or "lightweight" microVMs for one or more users. These compute servers 306 can support a virtualized computing service (or "hardware virtualization service") of the cloud provider network. The virtualized computing service may be part of the control plane 314A, allowing customers to issue commands via an interface 304 (e.g., an API) to launch and manage compute instances (e.g., VMs, containers) for their applications. The virtualized computing service may offer virtual compute instances with varying computational and/or memory resources. In one example, each of the virtual compute instances may correspond to one of several instance types. An instance type may be characterized by its hardware type, computational resources (e.g., number, type, and configuration of CPUs or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

The data plane 316A can also include one or more block store servers 308, which can include persistent storage for storing volumes of customer data as well as software for managing these volumes. These block store servers 308 can support a managed block storage service of the cloud provider network. The managed block storage service may be part of the control plane 314A, allowing customers to issue commands via the interface 304 (e.g., an API) to create and manage volumes for their applications running on compute instances. The block store servers 308 include one or more servers on which data is stored as blocks. A block is a sequence of bytes or bits, usually containing some whole number of records, having a maximum length of the block size. Blocked data is normally stored in a data buffer and read or written a whole block at a time. In general, a volume can correspond to a logical collection of data, such as a set of data maintained on behalf of a user. User volumes, which can be treated as an individual hard drive ranging for example from one gigabyte (GB) to one terabyte (TB) or more in size, are made of one or more blocks stored on the block store servers. Although treated as an individual hard drive, it will be appreciated that a volume may be stored as one or more virtualized devices implemented on one or more underlying physical host devices. Volumes may be partitioned a small number of times (e.g., up to sixteen) with each partition hosted by a different host. The data of the volume may be replicated between multiple devices within the cloud provider network, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas. A compute instance can virtualize its I/O to a volume by way of a client. The client represents instructions that enable a compute instance to connect to, and perform I/O operations at, a remote data volume (e.g., a data volume stored on a physically separate computing device accessed over a network). The client may be implemented on an offload card of a server that includes the processing units (e.g., CPUs or GPUs) of the compute instance.

The data plane 316A can also include one or more object store servers 310, which represent another type of storage within the cloud provider network. The object storage servers 310 include one or more servers on which data is stored as objects within resources referred to as buckets and can be used to support a managed object storage service of the cloud provider network. Each object typically includes the data being stored, a variable amount of metadata that enables various capabilities for the object storage servers with respect to analyzing a stored object, and a globally unique identifier or key that can be used to retrieve the object. Each bucket is associated with a given user account. Customers can store as many objects as desired within their buckets, can write, read, and delete objects in their buckets, and can control access to their buckets and the objects contained therein. Further, in examples having a number of different object storage servers distributed across different ones of the regions described above, users can choose the region (or regions) where a bucket is stored, for example to optimize for latency. Customers may use buckets to store objects of a variety of types, including machine images that can be used to launch VMs, and snapshots that represent a point-in-time view of the data of a volume.

A CEL 114 provides resources and services of the cloud provider network 100 within a separate network, thereby extending functionality of the cloud provider network 100 to new locations (e.g., for reasons related to latency in communications with customer devices, legal compliance, security, etc.). As indicated, such edge locations 114 can include cloud provider network-managed edge locations 114B (e.g., formed by servers located in a cloud provider-managed facility separate from those associated with the cloud provider network 100), CSP edge locations 114A (e.g., formed by servers associated with communications service provider facilities), customer-managed edge locations 344 (e.g., formed by servers located on-premise in a customer or partner facility), among other possible types of edge locations.

As illustrated, the example cloud provider network-managed edge location 114B can similarly include a logical separation between a control plane 318B and a data plane 320B, respectively extending the control plane 314A and data plane 316A of the cloud provider network 100. The edge location 114B may be pre-configured, e.g., by the cloud provider network operator, with an appropriate combination of hardware with software and/or firmware elements to support various types of computing-related resources, and to do so in a manner that mirrors the experience of using the cloud provider network. For example, one or more edge location servers can be provisioned by the cloud provider for deployment within a CEL 114. As described above, the cloud provider network 100 may offer a set of predefined instance types, each having varying types and quantities of underlying hardware resources. Each instance type may also be offered in various sizes.

In order to enable customers to continue using the same instance types and sizes in a CEL 114 as they do in the region, the servers can be heterogeneous servers. A heterogeneous server can concurrently support multiple instance sizes of the same type and may be also reconfigured to host whatever instance types are supported by its underlying hardware resources. The reconfiguration of the heterogeneous server can occur on-the-fly using the available capacity of the servers, that is, while other instances are still running and consuming other capacity of the edge location servers. This can improve utilization of computing resources within the edge location by allowing for better packing of running instances on servers, and also may provide a seamless experience regarding instance usage across the cloud provider network 100 and the cloud provider network edge location 114B.

As illustrated, the edge location servers can host one or more compute instances 322. Compute instances 322 can be VMs, or containers that package up code and all its dependencies so an application can run quickly and reliably across computing environments (e.g., including VMs). In addition, the servers may host one or more data volumes 324, if desired by the customer. In the region of a cloud provider network 100, such volumes may be hosted on dedicated block store servers. However, due to the possibility of having a significantly smaller capacity at a CEL 114 than in the region, an optimal utilization experience may not be provided if the edge location includes such dedicated block store servers. Accordingly, a block storage service may be virtualized in a CEL 114, such that one of the VMs runs the block store software and stores the data of a volume 324. Similar to the operation of a block storage service in the region of a cloud provider network 100, the volumes 324 within a CEL 114 may be replicated for durability and availability. The volumes may be provisioned within their own isolated virtual network within the edge location 114. The compute instances 322 and any volumes 324 collectively make up a data plane extension 320B of the provider network data plane 316A within the edge location 114.

The servers within a CEL 114 may, in some implementations, host certain local control plane components 326, for example, components that enable a CEL 114 to continue functioning if there is a break in the connection back to the cloud provider network 100. Examples of these components include a migration manager that can move compute instances 322 between edge location servers if needed to maintain availability, and a key value data store that indicates where volume replicas are located. However, generally the control plane 318B functionality for a cloud edge location will remain in the cloud provider network 100 in order to allow customers to use as much resource capacity of the edge location as possible.

Server software running at a CEL 114 may be designed by the cloud provider to run on the cloud provider substrate network, and this software may be enabled to run unmodified in a CEL 114 by using local network manager(s) 328 to create a private replica of the substrate network within the edge location (a "shadow substrate"). The local network manager(s) 328 can run on edge location 114B servers and bridge the shadow substrate with the edge location 114B network, for example, by acting as a virtual private network (VPN) endpoint or endpoints between the edge location 114B and the proxies 330/332 in the cloud provider network 100 and by implementing the mapping service (for traffic encapsulation and decapsulation) to relate data plane traffic (from the data plane proxies) and control plane traffic (from the control plane proxies) to the appropriate server(s). By implementing a local version of the provider network's substrate-overlay mapping service, the local network manager(s) 328 allows resources in the edge location 114B to seamlessly communicate with resources in the cloud provider network 100. In some implementations, a single local network manager can perform these actions for all servers hosting compute instances 322 in a CEL 114. In other implementations, each of the server hosting compute instances 322 may have a dedicated local network manager. In multi-rack edge locations, inter-rack communications can go through the local network managers, with local network managers maintaining open tunnels to one another.

Edge locations can utilize secure networking tunnels through the edge location 114B network to the cloud provider network 100, for example, to maintain security of customer data when traversing the edge location 114B network and any other intermediate network (which may include the public internet). Within the cloud provider network 100, these tunnels are composed of virtual infrastructure components including isolated virtual networks (e.g., in the overlay network), control plane proxies 330, data plane proxies 332, and substrate network interfaces. Such proxies may be implemented as containers running on compute instances. In some examples, each server in a CEL 114 that hosts compute instances can utilize at least two tunnels: one for control plane traffic (e.g., Constrained Application Protocol (CoAP) traffic) and one for encapsulated data plane traffic. A connectivity manager (not shown) within the cloud provider network manages the cloud provider network-side lifecycle of these tunnels and their components, for example, by provisioning them automatically when needed and maintaining them in a healthy operating state. In some examples, a direct connection between a CEL 114 location and the cloud provider network 100 can be used for control and data plane communications. As compared to a VPN through other networks, the direct connection can provide constant bandwidth and more consistent network performance because of its relatively fixed and stable network path.

A control plane (CP) proxy 330 can be provisioned in the cloud provider network 100 to represent particular host(s) in a cloud edge location. CP proxies are intermediaries between the control plane 314A in the cloud provider network 100 and control plane targets in the control plane 318B of edge location 114B. That is, CP proxies 330 provide infrastructure for tunneling management API traffic destined for edge location servers out of the region substrate and to the edge location 114B. For example, a virtualized computing service of the cloud provider network 100 can issue a command to a VMM of a server of a CEL 114 to launch a compute instance 322. A CP proxy maintains a tunnel (e.g., a VPN) to a local network manager 328 of the edge location. The software implemented within the CP proxies ensures that only well-formed API traffic leaves from and returns to the substrate. CP proxies provide a mechanism to expose remote servers on the cloud provider substrate while still protecting substrate security materials (e.g., encryption keys, security tokens) from leaving the cloud provider network 100. The one-way control plane traffic tunnel imposed by the CP proxies also prevents any (potentially compromised) devices from making calls back to the substrate. CP proxies may be instantiated one-for-one with servers at a CEL 114 or may be able to manage control plane traffic for multiple servers in the same edge location.

A data plane (DP) proxy 332 can also be provisioned in the cloud provider network 100 to represent particular server(s) in a CEL 114. The DP proxy 332 acts as a shadow or anchor of the server(s) and can be used by services within the cloud provider network 100 to monitor health of the host (including its availability, used/free compute and capacity, used/free storage and capacity, and network bandwidth usage/availability). The DP proxy 332 also allows isolated virtual networks to span cloud edge locations 114B and the cloud provider network 100 by acting as a proxy for server(s) in the cloud provider network 100. Each DP proxy 332 can be implemented as a packet-forwarding compute instance or container. As illustrated, each DP proxy 332 can maintain a VPN tunnel with a local network manager 328 that manages traffic to the server(s) that the DP proxy 332 represents. This tunnel can be used to send data plane traffic between the edge location server(s) and the cloud provider network 100. Data plane traffic flowing between a CEL 114 and the cloud provider network 100 can be passed through DP proxies 332 associated with that edge location. For data plane traffic flowing from a CEL 114 to the cloud provider network 100, DP proxies 332 can receive encapsulated data plane traffic, validate it for correctness, and allow it to enter into the cloud provider network 100. DP proxies 332 can forward encapsulated traffic from the cloud provider network 100 directly to a CEL 114.

Local network manager(s) 328 can provide secure network connectivity with the proxies 330/332 established in the cloud provider network 100. After connectivity has been established between the local network manager(s) 328 and the proxies, customers may issue commands via the interface 304 to instantiate compute instances (and/or perform other operations using compute instances) using edge location resources in a manner analogous to the way in which such commands would be issued with respect to compute instances hosted within the cloud provider network 100. From the perspective of the customer, the customer can now seamlessly use local resources within a cloud edge location (as well as resources located in the cloud provider network 100, if desired). The compute instances set up on a server at a CEL 114 may communicate both with electronic devices located in the same network as well as with other resources that are set up in the cloud provider network 100, as desired. A local gateway 346 can be implemented to provide network connectivity between a CEL 114 and a network associated with the extension (e.g., a communications service provider network in the example of a cloud edge location 114A).

There may be circumstances that necessitate the transfer of data between the object storage service and a CEL 114.

For example, the object storage service may store machine images used to launch VMs, as well as snapshots representing point-in-time backups of volumes. The object gateway can be provided on a cloud edge location server or a specialized storage device, and provide customers with configurable, per-bucket caching of object storage bucket contents in their edge location to minimize the impact of edge location-region latency on the customer's workloads. The object gateway can also temporarily store snapshot data from snapshots of volumes in the edge location and then sync with the object servers in the region when possible. The object gateway can also store machine images that the customer designates for use within the edge location or on the customer's premises. In some implementations, the data within the edge location may be encrypted with a unique key, and the cloud provider can limit keys from being shared from the region to the edge location for security reasons. Accordingly, data exchanged between the object store servers and the object gateway may utilize encryption, decryption, and/or re-encryption to preserve security boundaries with respect to encryption keys or other sensitive data. The transformation intermediary can perform these operations, and a cloud edge location bucket can be created (on the object store servers) to store snapshot and machine image data using the edge location encryption key.

In the manner described above, a cloud edge location thus provides the resources and services of the cloud provider network outside of a traditional cloud provider data center and closer to customer devices. A cloud edge location, as referred to herein, can be structured in several ways. In some implementations, a cloud edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations 114B may be referred to as "local zones" that may be connected in various ways to a publicly accessible network such as the Internet, for example directly, via another network, or via a private connection to a region. Although typically a local zone would have more limited capacity than a region, in some cases a local zone may have substantial capacity, for example, thousands of racks of server devices or more.

In some implementations, a cloud edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of edge location 114C located outside of cloud provider network data centers can be referred to as an "outpost" of the cloud provider network. Some edge locations 114A may be integrated into communications networks, for example as a multi-access edge computing (MEC) site having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

A cloud edge location can include data plane capacity controlled at least partly by a control plane of a nearby availability zone of the provider network. As such, an availability zone group can include a "parent" availability zone and any "child" edge locations "homed" to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, a cloud edge location refers to an extension of at least data plane capacity that is positioned at the edge of the cloud provider network, close to customer devices and/or workloads.

Figure 4:
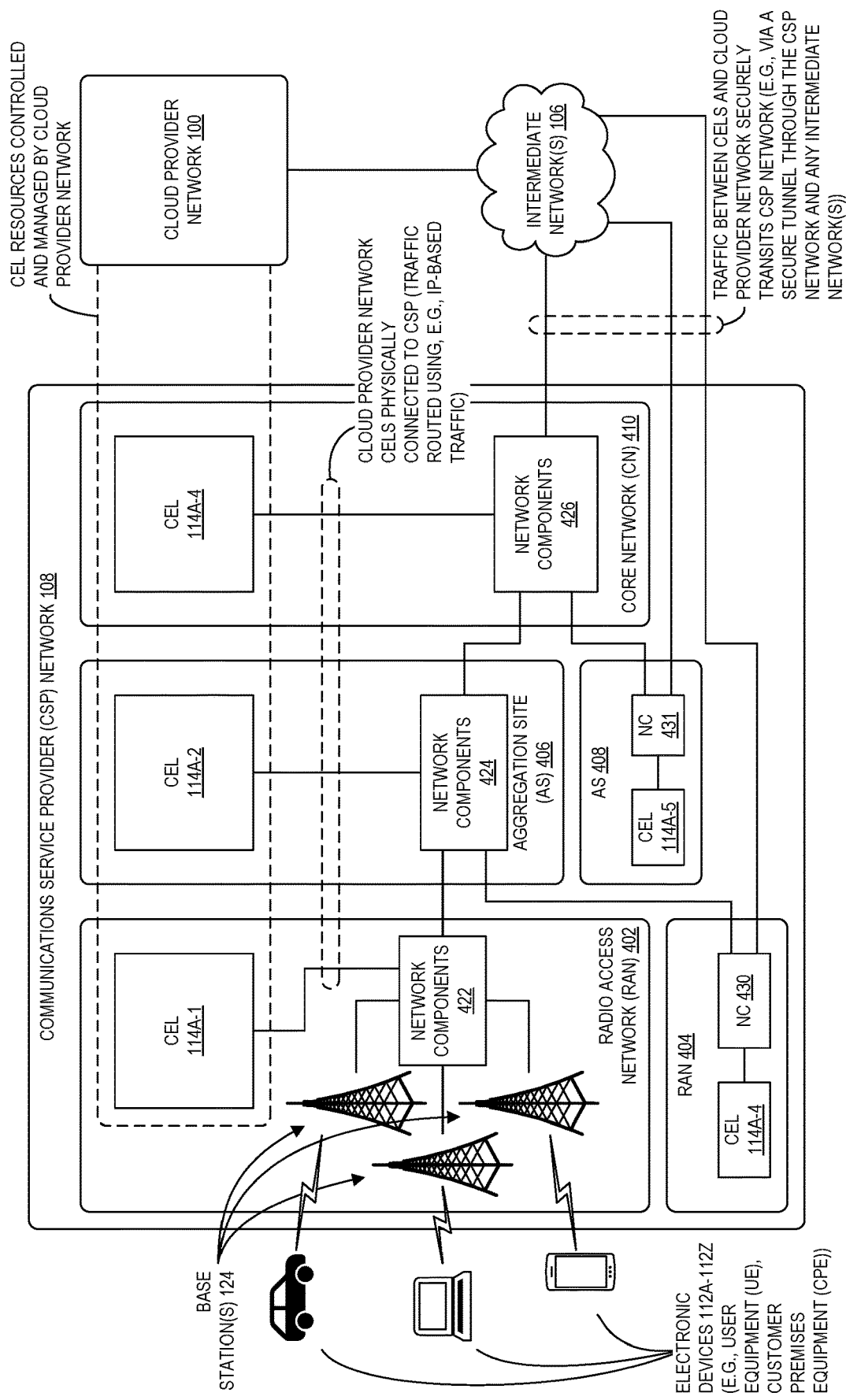
FIG. 4 illustrates an exemplary system in which cloud edge locations are deployed within a communications service provider network according to some examples.

FIG. 4 illustrates an exemplary system in which cloud edge locations are deployed within a CSP network according to some examples. A CSP network 108 generally includes a downstream interface to end user electronic devices and an upstream interface to other networks (e.g., the internet). In this example, the CSP network 108 is a wireless "cellular" CSP network that includes radio access networks (RAN) 402/404, aggregation sites (AS) 406/408, and a core network (CN) 410. The RANs 402/404 include base stations 124 (e.g., NodeBs, eNodeBs, gNodeBs) that provide wireless connectivity to electronic devices 112A-112Z. The core network 410 typically includes functionality related to the management of the CSP network (e.g., billing, mobility management, etc.) and transport functionality to relay traffic between the CSP network and other networks. Aggregation sites 406/408 can serve to consolidate traffic from many different RANs to the core network and to direct traffic originating from the core network to the various radio access networks.

From left to right in FIG. 4, end user electronic devices 112 wirelessly connect to base stations (or radio base stations) 124 of a radio access network 402. Such electronic devices 112 are sometimes referred to as user equipment (UE) or customer premises equipment (CPE). Data traffic is often routed through a fiber transport network consisting of multiple hops of layer 3 routers (e.g., at aggregation sites) to the core network 410. The core network 410 is typically housed in one or more data centers. For data traffic destined for locations outside of the CSP network 108, the network components 422-426 typically include a firewall through which traffic can enter or leave the CSP network 108 to external networks such as the internet or a cloud provider network 100. Note that in some examples, the CSP network 108 can include facilities to permit traffic to enter or leave from sites further downstream from the core network 410 (e.g., at an aggregation site or RAN).

Cloud edge locations 114A-1 through 114A-3 include computing resources managed as part of a cloud provider network but installed or sited within various points of a CSP network (e.g., on premise in a CSP owned or leased space). The computing resources typically provide some amount of compute and memory capacity that the cloud provider can allocate for use by its customers. The computing resources can further include storage and accelerator capacity (e.g., solid-state drives, graphics accelerators, etc.). Here, edge locations 114A-1, 114A-2, and 114A-3 are in communication with a cloud provider network 100.

Typically, the further—e.g., in terms of network hops and/or distance—a cloud edge location is from the cloud provider network 100 (or closer to electronic devices 112), the lower the network latency is between computing resources within the edge location and the electronic devices 112. However, physical site constraints often limit the amount of edge location computing capacity that can be installed at various points within the CSP or determine whether computing capacity can be installed at various points at all. For example, a cloud edge location sited within the core network 410 can typically have a much larger footprint (in terms of physical space, power requirements, cooling requirements, etc.) than a cloud edge location sited within the RAN 402, 404.

The installation or siting of cloud edge locations within a CSP network can vary subject to the particular network topology or architecture of the CSP network. As indicated in FIG. 4, edge locations can generally be connected anywhere the CSP network can break out packet-based traffic (e.g., IP based traffic). Additionally, communications between a given edge location and the cloud provider network 100 typically securely transit at least a portion of the CSP network 108 (e.g., via a secure tunnel, virtual private network, a direct connection, etc.). In the illustrated example, the network components 422 facilitate the routing of data traffic to and from a cloud edge location 114A-1 integrated with the RAN 402, the network components 424 facilitate the routing of data traffic to and from a cloud edge location 114A-2 integrated with the AS 406, and the network components 426 facilitate the routing of data traffic to and from a cloud edge location 114A-3 integrated with the CN 410. Network components 422-426 can include routers, gateways, or firewalls. To facilitate routing, the CSP can allocate one or more IP addresses from the CSP network address space to each of the edge locations.

In 5G wireless network development efforts, edge locations may be considered a possible implementation of Multi-access Edge Computing (MEC). Such edge locations can be connected to various points within a CSP 5G network that provide a breakout for data traffic as part of the User Plane Function (UPF). Older wireless networks can incorporate edge locations as well. In 3G wireless networks, for example, edge locations can be connected to the packet-switched network portion of a CSP network, such as to a Serving General Packet Radio Services Support Node (SGSN) or to a Gateway General Packet Radio Services Support Node (GGSN). In 4G wireless networks, edge locations can be connected to a Serving Gateway (SGW) or Packet Data Network Gateway (PGW) as part of the core network or evolved packet core (EPC).

In some examples, traffic between a cloud edge location 428 and the cloud provider network 100 can be broken out of the CSP network 108 without routing through the core network 410. For example, network components 430 of a RAN 404 can be configured to route traffic between a cloud edge location 114A-1 of the RAN 404 and the cloud provider network 100 without traversing an aggregation site or core network 410. As another example, network components 431 of an aggregation site 408 can be configured to route traffic between a cloud edge location 432 of the aggregation site 408 and the cloud provider network 100 without traversing the core network 410. The network components 430/431 can include a gateway or router having route data to direct traffic from the edge location destined for the cloud provider network 100 to the cloud provider network 100 (e.g., through a direct connection or an intermediate network 106) and to direct traffic from the cloud provider network 100 destined for the edge location to the edge location.

In some examples, CELs can be connected to more than one CSP network. For example, when two CSPs share or route traffic through a common point, a cloud edge location can be connected to both CSP networks. For example, each CSP can assign some portion of its network address space to the edge location, and the edge location can include a router or gateway that can distinguish traffic exchanged with each of the CSP networks. For example, traffic destined for the edge location from one CSP network might have a different destination IP address, source IP address, and/or virtual local area network (VLAN) tag than traffic received from another CSP network. Traffic originating from the edge location to a destination on one of the CSP networks can be similarly encapsulated to have the appropriate VLAN tag, source IP address (e.g., from the pool allocated to the edge location from the destination CSP network address space) and destination IP address.

Note that while the exemplary CSP network architecture of FIG. 4 includes radio access networks, aggregation sites, and a core network, the architecture of a CSP network can vary in naming and structure across generations of wireless technology, between different CSPs, as well as between wireless and fixed-line CSP networks. Additionally, while FIG. 4 illustrates several locations where a cloud edge location can be sited within a CSP network, other locations are possible (e.g., at a base station).

Figure 5:
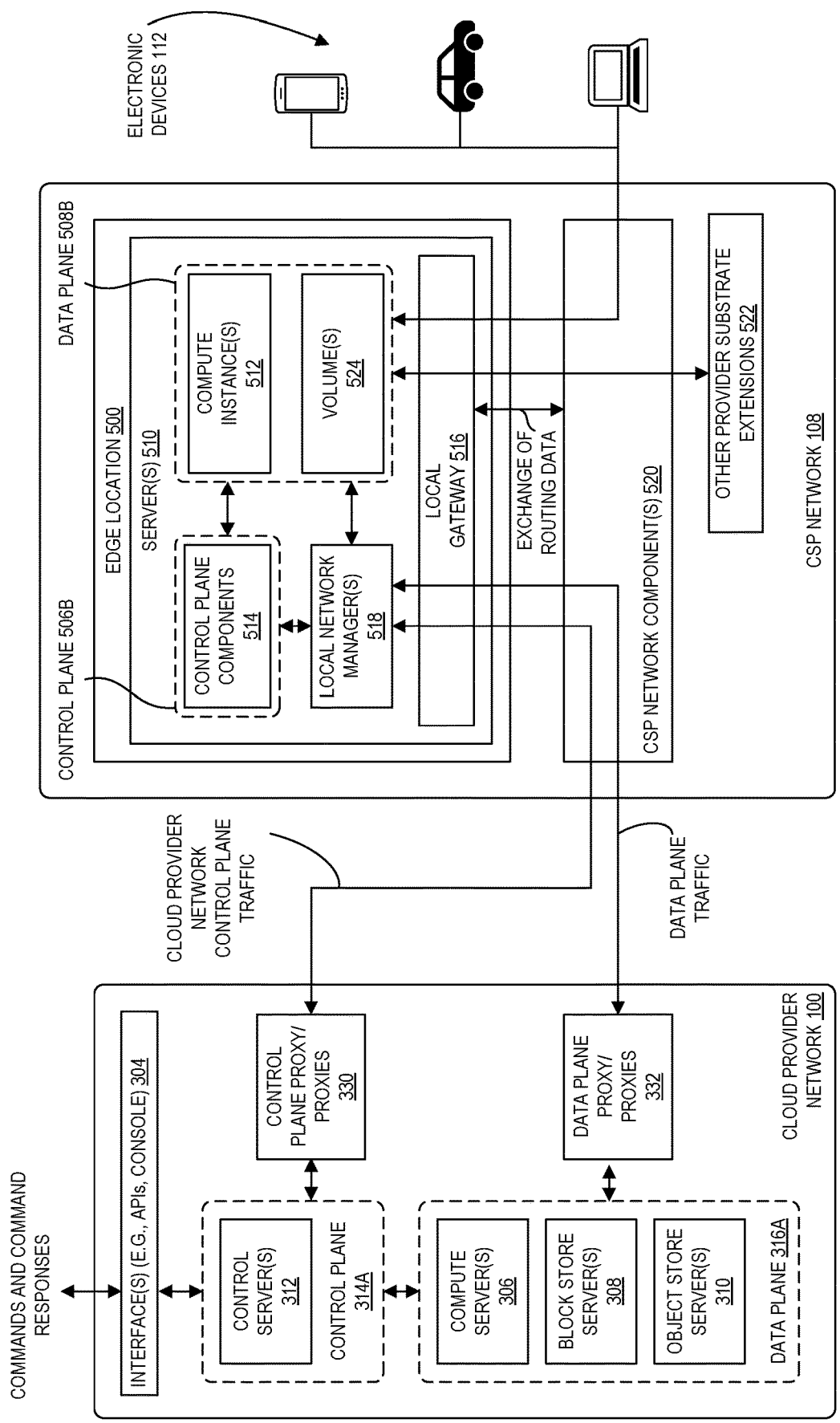
FIG. 5 illustrates in greater detail exemplary components of and connectivity between a cloud edge location and a cloud provider network according to some examples.

FIG. 5 illustrates in greater detail exemplary components of and connectivity between a cloud edge location associated with a communications service provider and a cloud provider network according to some examples. A cloud edge location 500 provides resources and services of the cloud provider network within a CSP network 108 thereby extending functionality of the cloud provider network 100 to be closer to end user electronic devices 112 connected to the CSP network.

The edge location 500 similarly includes a logical separation between a control plane 506B and a data plane 508B, respectively extending the control plane 314A and data plane 316A of the cloud provider network 100. The edge location 500 may be pre-configured, e.g., by the cloud provider network operator, with an appropriate combination of hardware with software and/or firmware elements to support various types of computing-related resources, and to do so in a manner that mirrors the experience of using the cloud provider network. For example, one or more edge location servers 510 can be provisioned by the cloud provider for deployment within the CSP network 108.

The servers 510 within a cloud edge location 500 may, in some implementations, host certain local control plane components 514, for example, components that enable the edge location 500 to continue functioning if there is a break in the connection back to the cloud provider network 100. Further, certain controller functions may typically be implemented locally on data plane servers, even in the cloud provider datacenters—for example a function for collecting metrics for monitoring instance health and sending them to a monitoring service, and a function for coordinating transfer of instance state data during live migration. However, generally the control plane 506B functionality for a cloud edge location 500 will remain in the cloud provider network 100 to allow customers to use as much resource capacity of the edge location as possible.

As illustrated, the edge location servers 510 can host compute instances 512. Compute instances can be VMs, lightweight "microVMs," or containers that package up code and all its dependencies so an application can run quickly and reliably across computing environments (e.g., including VMs). Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In some examples, the execution of edge-optimized compute instances is supported by a lightweight virtual machine manager (VMM) running on the servers 510 upon which edge-optimized compute instances are launched based on application profiles. These VMMs enable the launch of lightweight micro-virtual machines (microVMs) in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per micro VM such that thousands of microVMs can be packed onto a single host. For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

In addition, the servers 510 may host one or more data volumes 524, if desired by the customer. The volumes may be provisioned within their own isolated virtual network within the edge location 500. The compute instances 512 and any volumes 524 collectively make up a data plane extension 508B of the provider network data plane 316A within the edge location 500.

A local gateway 516 can be implemented to provide network connectivity between the edge location 500 and the CSP network 108. The cloud provider can configure the local gateway 516 with an IP address on the CSP network 108 and to exchange routing data (e.g., via the Border Gateway Protocol (BGP)) with the CSP network components 520. The local gateway 516 can include one or more route tables that control the routing of inbound traffic to the edge location 500 and outbound traffic leaving the edge location 500. The local gateway 516 can also support multiple VLANs in cases where the CSP network 108 uses separate VLANs for different portions of the CSP network 108 (e.g., one VLAN tag for the wireless network and another VLAN tag for a fixed network).

In some examples of a cloud edge location 500, the extension includes one or more switches, sometimes referred to top of rack (TOR) switches (e.g., in rack-based examples). The TOR switches are connected to CSP network routers (e.g., CSP network components 520), such as Provider Edge (PE) or Software Defined Wide Area Network (SD-WAN) routers. Each TOR switch can include an uplink Link Aggregation (LAG) interface to the CSP network router supporting multiple physical links per LAG (e.g., 1G/10G/40G/100G). The links can run Link Aggregation Control Protocol (LACP) and be configured as IEEE802.1q trunks to enable multiple VLANs over the same interface. Such a LACP-LAG configuration allows a cloud edge location management entity of the control plane of the cloud provider network 100 to add more peering links to a cloud edge location without adjustments to routing. Each of the TOR switches can establish eBGP sessions with the carrier PE or SD-WAN routers. The CSP can provide a private Autonomous System Number (ASN) for the edge location and an ASN of the CSP network 108 to facilitate the exchange of routing data.

Data plane traffic originating from the edge location 500 can have a number of different destinations. For example, traffic addressed to a destination in the data plane 316A of the cloud provider network 100 can be routed via the data plane connection between the edge location 500 and the cloud provider network 100. The local network manager 518 can receive a packet from a compute instance 512 addressed to, for example, another compute instance in the cloud provider network 100 and encapsulate the packet with a destination as the substrate IP address of the server hosting the other compute instance before sending it to the cloud provider network 100 (e.g., via a direct connection or tunnel). For traffic from a compute instance 512 addressed to another compute instance hosted in another edge location 522, the local network manager 518 can encapsulate the packet with a destination as the IP address assigned to the other edge location 522, thereby allowing the CSP network components 520 to handle the routing of the packet. Alternatively, if the CSP network components 520 do not support inter-edge location traffic, the local network manager 518 can address the packet to a relay in the cloud provider network 100 that can send the packet to the other edge location 522 via its data plane connection (not shown) to the cloud provider network 100. Similarly, for traffic from a compute instance 512 address to a location outside of the CSP network 108 or the cloud provider network 100 (e.g., on the internet), if the CSP network components 520 permit routing to the internet, the local network manager 518 can encapsulate the packet with a source IP address corresponding to the IP address in the carrier address space assigned to the compute instance 512. Otherwise, the local network manager 518 can send the packet to an Internet Gateway in the cloud provider network 100 that can provide Internet connectivity for the compute instance 512. For traffic from a compute instance 512 addressed to an electronic device 112, the local gateway 516 can use Network Address Translation (NAT) to change the source IP address of the packet from an address in an address space of the cloud provider network to an address space of the carrier network.

The local gateway 516, local network manager(s) 518, and other local control plane components 514 may run on the same servers 510 that host compute instances 512, may run on a dedicated processor (e.g., on an offload card) integrated with edge location servers 510, or can be executed by servers separate from those that host customer resources.

Figure 6:
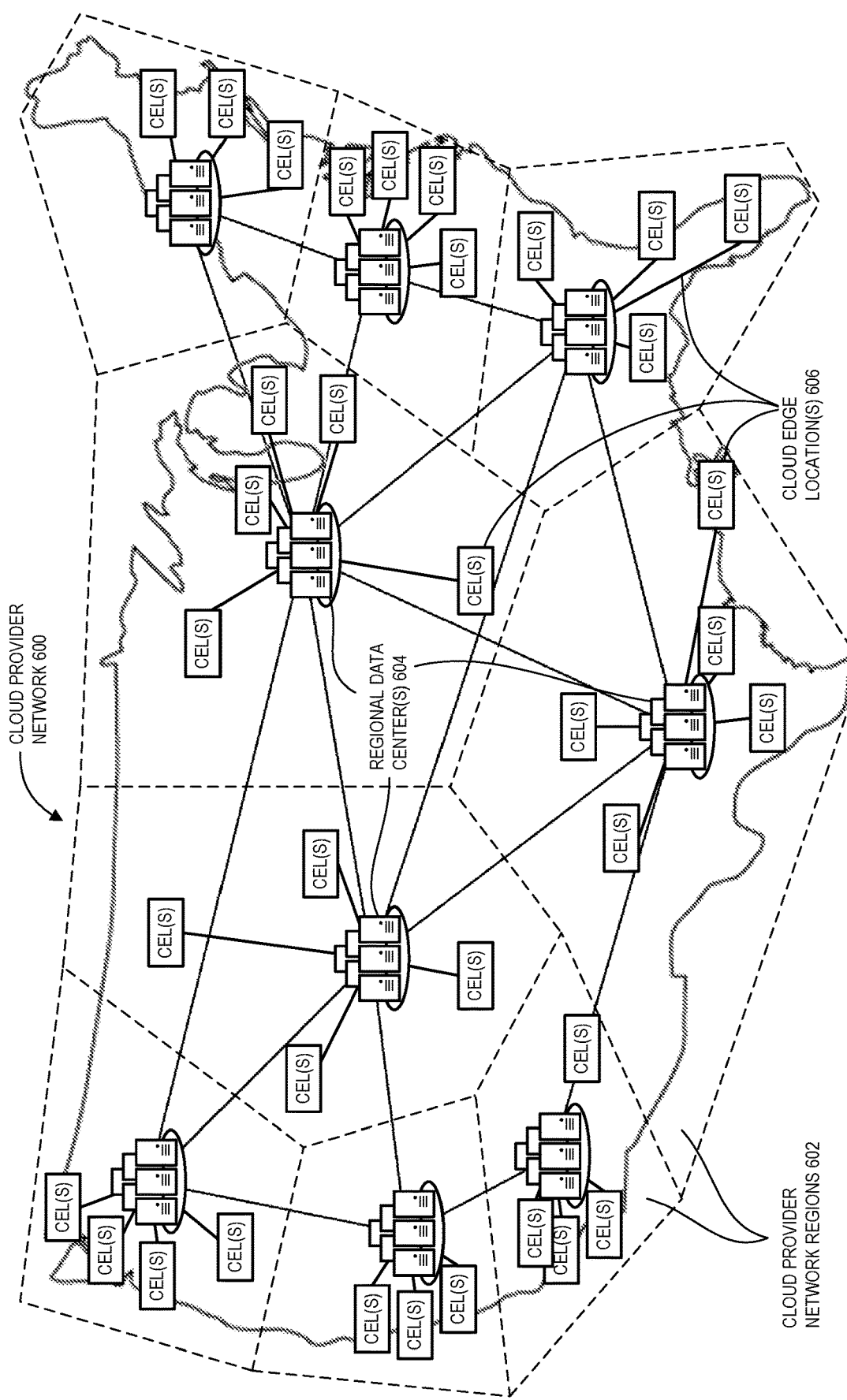
FIG. 6 illustrates an exemplary cloud provider network including edge locations according to some examples.

FIG. 6 illustrates an exemplary cloud provider network including cloud edge locations according to some examples. As illustrated, a cloud provider network 100 can be formed as a number of regions 602, where a region is a separate geographical area in which the cloud provider has one or more data centers 604. Each region 602 can include two or more availability zones (AZs) connected to one another via a private high-speed network such as, for example, a fiber communication connection. An AZ refers to an isolated failure domain including one or more data center facilities with separate power, separate networking, and separate cooling relative to other availability zones. A cloud provider may strive to position availability zones within a region far enough away from one other such that a natural disaster, widespread power outage, or other unexpected event does not take more than one availability zone offline at the same time. Customers can connect to resources within availability zones of the cloud provider network via a publicly accessible network (e.g., the Internet, a cellular communication network, a CSP network). Transit Centers (TC) are the primary backbone locations linking customers to the cloud provider network and may be co-located at other network provider facilities (e.g., Internet service providers, telecommunications providers). Each region can operate two or more TCs for redundancy.

In comparison to the number of regional data centers or availability zones, the number of edge locations 606 can be much higher. Such widespread deployment of edge locations 606 can provide low-latency connectivity to the cloud for a much larger group of end user devices (in comparison to those that happen to be very close to a regional data center). In some examples, each edge location 606 can be peered to some portion of the cloud provider network 100 (e.g., a parent availability zone or regional data center). Such peering allows the various components operating in the cloud provider network 100 to manage the compute resources of the edge location. In some cases, multiple edge locations may be sited or installed in the same facility (e.g., separate racks of computer systems) and managed by different zones or data centers to provide additional redundancy. Note that although edge locations are typically depicted herein as within a CSP network, in some cases, such as when a cloud provider network facility is relatively close to a communications service provider facility, the edge location can remain within the physical premises of the cloud provider network while being connected to the communications service provider network via a fiber or other network link.

A cloud edge location 606 can be structured in several ways. In some implementations, a cloud edge location 606 can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being "near" or "local" to customer workloads). A local zone may be connected in various ways to a publicly accessible network such as the Internet, for example directly, via another network, or via a private connection to a region. Although typically a local zone has more limited capacity than a region, in some cases a local zone may have substantial capacity, for example thousands of racks or more.

The parenting of a given edge location to an AZ or region of the cloud provider network can be based on a number of factors. One such parenting factor is data sovereignty. For example, to keep data originating from a CSP network in one country within that country, the edge locations deployed within that CSP network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, a cloud edge location could be parented to an AZ or region that supports the use of those resources. Another factor is the latency between the AZ or region and the edge location. While the deployment of edge locations within a CSP network has latency benefits, those benefits might be negated by parenting a cloud edge location to a distant AZ or region that introduces significant latency for edge location to region traffic. Accordingly, edge locations are often parented to nearby (in terms of network latency) AZs or regions.

One benefit provided by the utilization of edge locations with backing cloud provider networks is that computing resources implemented within edge locations are "closer" to end users, and thus such architectures can provide extremely low-latency interactions preferred by modern computing applications, such as video gaming, communications, etc. Thus, systems employing edge locations can satisfy customer use cases requiring low client latency and can allow users to launch compute instances (and other computing resources) around geographic areas to guarantee reliably low latencies for all clients in the coverage area. Moreover, such systems can provide a way for clients—e.g., mobile clients or wired clients—to be able to easily "discover" which computing instance(s) implementing an application they should connect to, given their current location.

Figure 7:
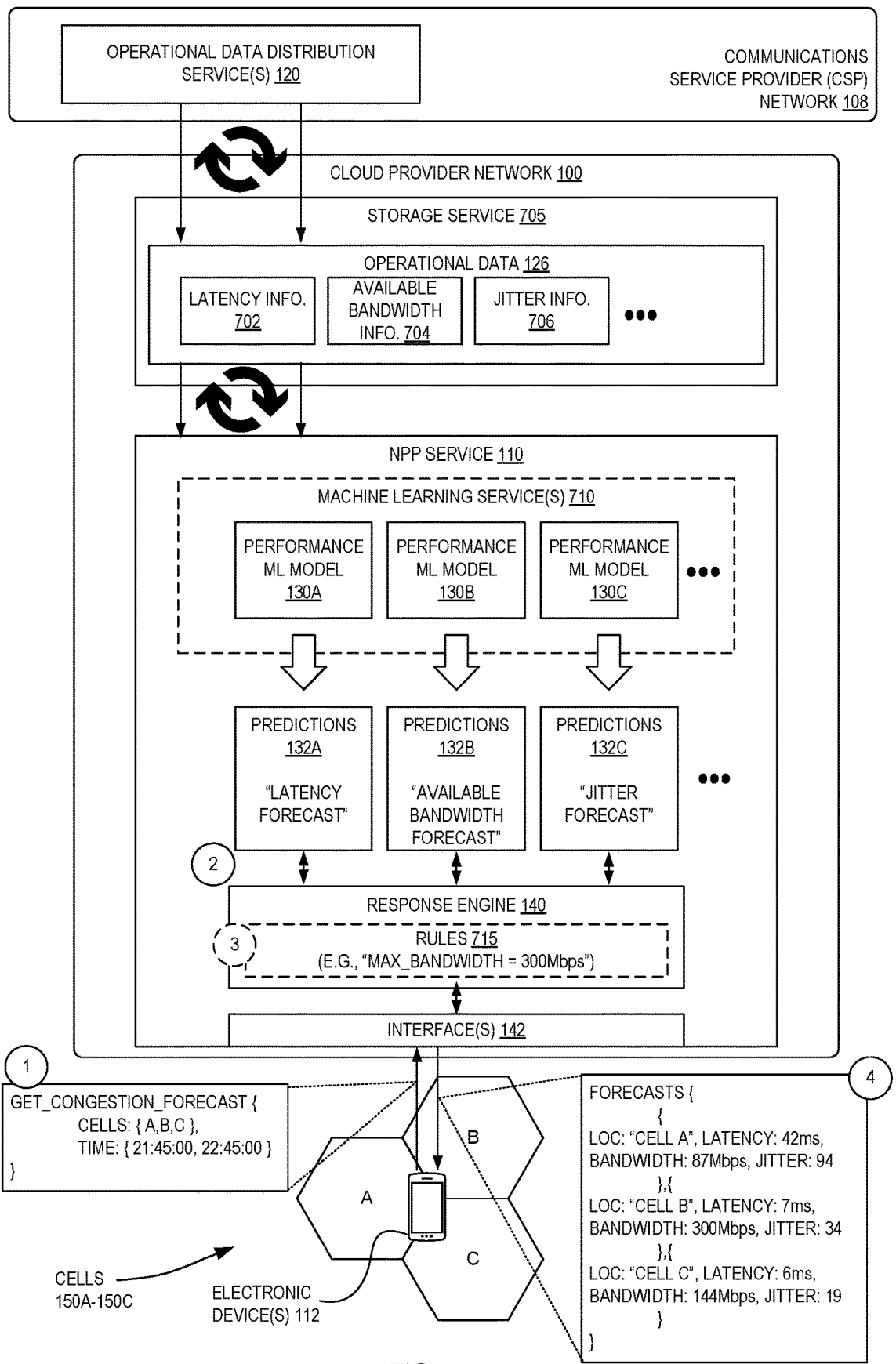
FIG. 7 is a diagram illustrating an environment for providing mobile network performance visibility with multiple performance factors via a congestion forecast application programming interface according to some examples.

Turning back more specifically to network performance prediction, FIG. 7 is a diagram illustrating an environment for providing mobile network performance visibility with multiple performance factors via a congestion forecast application programming interface according to some examples. In this example, operational data 126 including latency information 702, available bandwidth information 704, jitter information 706, etc., is obtained from the operational data distribution service 120 in an ongoing basis, e.g., via a request and response configuration, via a push configuration, or the like, and stored in a data lake implemented by a storage service 705.

At one or more points in time—such as once a day, once a week, or responsive to each new "batch" of operational data 126—multiple performance ML models 130A-130C can be trained and/or retrained using the data, which by way of example may be performed by the NPP service 110 via use of a machine learning service 710 such as a training system or forecasting system. In this case a first performance ML model 130A may be trained to make latency predictions, a second performance ML model 130B may be trained to make available bandwidth predictions, a third performance ML model 130C may be trained to make jitter predictions, and the like. These performance ML models 130A-130C can be used to generate synchronous predictions 132A-132C (e.g., for each request) or asynchronous predictions (e.g., generating a forecast, which is then used to process prediction requests from clients).

In this example, at circle (1) an electronic device 112 located near cells A, B, and C (e.g., cells 150A-150C) may send a "get congestion forecast" request providing, as parameters, an identifier of cells of interest (here, "A" and "B" and "C", which are visible to the device 112), and an identifier of a time window of interest (here, from 9:15 μm to 10:45 pm). However, in other cases, a "backend" component of an application (such as an application resource 116A deployed in a CEL 114A) may similarly make such a request on behalf of a particular client electronic device 112 to assist it in connecting to the application in an optimal manner.

Upon receipt, via the interface(s) 142, the response engine 140 can obtain the predictions corresponding to the requested type (of "congestion" from the request method) at circle (2), which in this case may involve the use of predictions for latency, bandwidth, and jitter (e.g., predictions 132A-132C). Optionally, the response engine 140 can then evaluate any provided rules 715 (e.g., a maximum available bandwidth can only be some value, here "300 Mbps") at circle (3) and refine the associated predicted values if needed and provide a response back to the device 112 at circle (4).

As illustrated, the response includes a forecast for each of the requested cells, providing for each prediction a cell identifier, a latency value, a bandwidth value, and a jitter value. In this case, it may be the case that the predicted bandwidth for cell "B" may have been larger than 300 Mbps, and thus was limited by the rules 715 to the actual value that the client can actually obtain.

In response, the originator of the request (whether it be the electronic device 112 or another application resource 116 component located elsewhere) can use this predictive information to make an intelligent decision regarding connectivity. For example, the electronic device 112 may decide to (or be instructed to) connect via one of the particular cells (e.g., Cell "B") based on an analysis of the response (e.g., by selecting a cell based on latency and bandwidth according to some formula).

Figure 8:
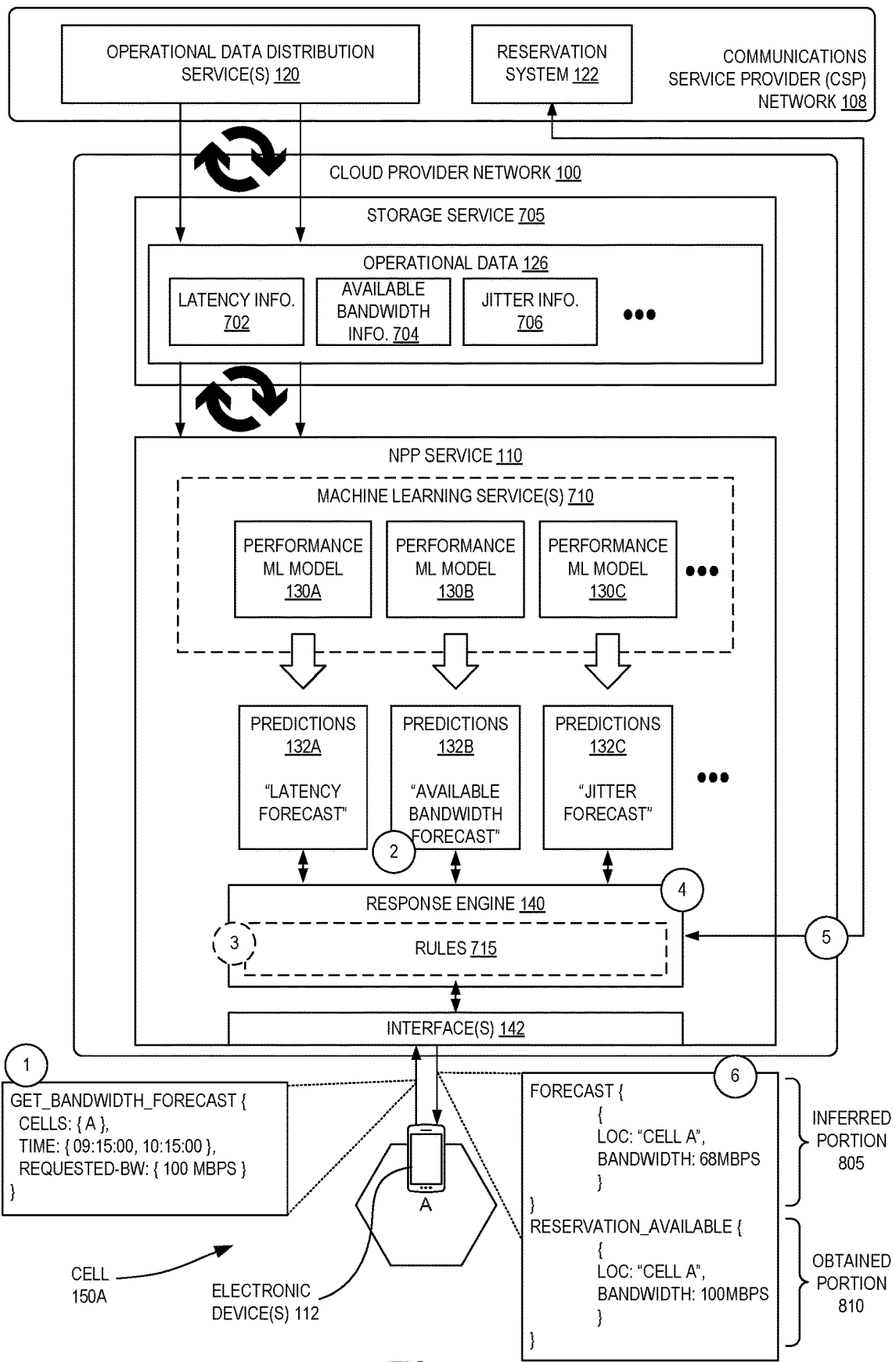
FIG. 8 is a diagram illustrating an environment for providing mobile network performance visibility and connectivity exploration and/or reservation according to some examples.

For a further example, FIG. 8 is a diagram illustrating an environment for providing mobile network performance visibility and connectivity exploration and/or reservation according to some examples.

In this example, at circle (1) an electronic device 112 located in a cell "A" 150A may send a "get bandwidth" request providing, as parameters, an identifier of cells of interest (here, "A"), an identifier of a time window of interest (here, from 9:15 to 10:15), and a requested (or "hoped for") bandwidth amount (here, 100 Mbps). Upon receipt, via the interface(s) 142, the response engine 140 can obtain the predictions 132B at circle (2) corresponding to the requested type (of "bandwidth" from the request method) and obtain the predicted bandwidth amounts corresponding to the particular cell(s) of interest and time(s) of interest, and evaluate rules 715 if needed at circle (3). In this case, the response engine 140 may use predictions 132B to determine that, for the requested location and time window, a bandwidth of 68 Mbps may only be available, which does not satisfy the requested amount of 100 Mbps. In some cases, this information can immediately be provided back to the client, such as by sending just the inferred portion 805 back at circle (6).

However, in some examples, the response engine 140 may communicate with a reservation system 122 at circle (5) of the CSP network 108 based on the request. This may occur, e.g., based on the response engine 140 determining, at circle (4), that the predicted value(s) does not satisfy the requested value. For example, in some examples, the response engine 140 can send a request to confirm whether the requested connectivity (e.g., 100 Mbps) is or is not available, and the response back from the reservation system 122 can be provided as the obtained portion 810 back in the response to the electronic device 112. In some cases, this value may be in the form of a resource that can be reserved for the electronic device 112 by the CSP, and optionally the electronic device 112 can send back another request to actually reserve that connectivity, though in various examples the reservation may be automatically granted earlier. As shown, the response may indicate, in the inferred portion 805, that only 68 Mbps is predicted to exist throughout the time window, whereas an obtained portion 810 (e.g., based on data obtained by the NPP service 110 from the reservation system 122) indicates that a 100 Mbps connection can be reserved, if needed.

As indicated herein, a wide variety of types of performance information can be obtained from a CSP, and a wide variety of types of interfaces 142 can be exposed to users to make use of this data.

For example, users could use an API to obtain a congestion forecast. Based on a particular UE device, IP address and/or location identifier, a client could request a forecast of the cell capacity for the duration of the consumer's session. The NPP service 110 could respond with network slide details with a forecast of the latency, bandwidth, and jitter that the app could expect. Such information could be used by an AR/VR application that could tune the resolution of its video stream to the available conditions.

As another example, users could use an API to obtain a network configuration. If the forecast does not meet the requirements of a request, a reservation or configuration of a network slice could be made for the user.

As another example, users could use an API for the purpose of dynamic admission control, e.g., to use a forecasted available capacity to function as a Call Admission Control (CAC) to the application, such as controlling access to an audience seeking to stream a video. As the numbers grow the application can thus intelligently manage the service admission to ensure the network can support the growing user population.

As another example, users could use an API toward implementing connectivity reliability, e.g., by using the location of UE devices and their usage to provide a prediction for how reliable the connection will be to enable an application to determine the safety of the operation, for example, a drone flying around a warehouse.

As another example, users could use an API to forecast generally available bandwidth/QoE, and if the available connectivity is not sufficient, switch to a different tier of service or network slice, allowing users to employ an optimized cost model while delivering the best service possible.

As another example, for mobile use cases (e.g., Cellular Vehicle-to-Everything (CV2X)), an application could use the service to inform drivers that certain enhanced services will likely be unavailable at some times and/or at some locations, to enable the in vehicular systems to intelligently inform the driver so that they will not rely on the system in areas of poor/congested coverage.

As indicated elsewhere herein, examples may additionally or alternatively make use of network performance data obtained from sources outside of the CSP itself, e.g., via a distributed network testing of a third party or of the cloud provider network.

Figure 9:
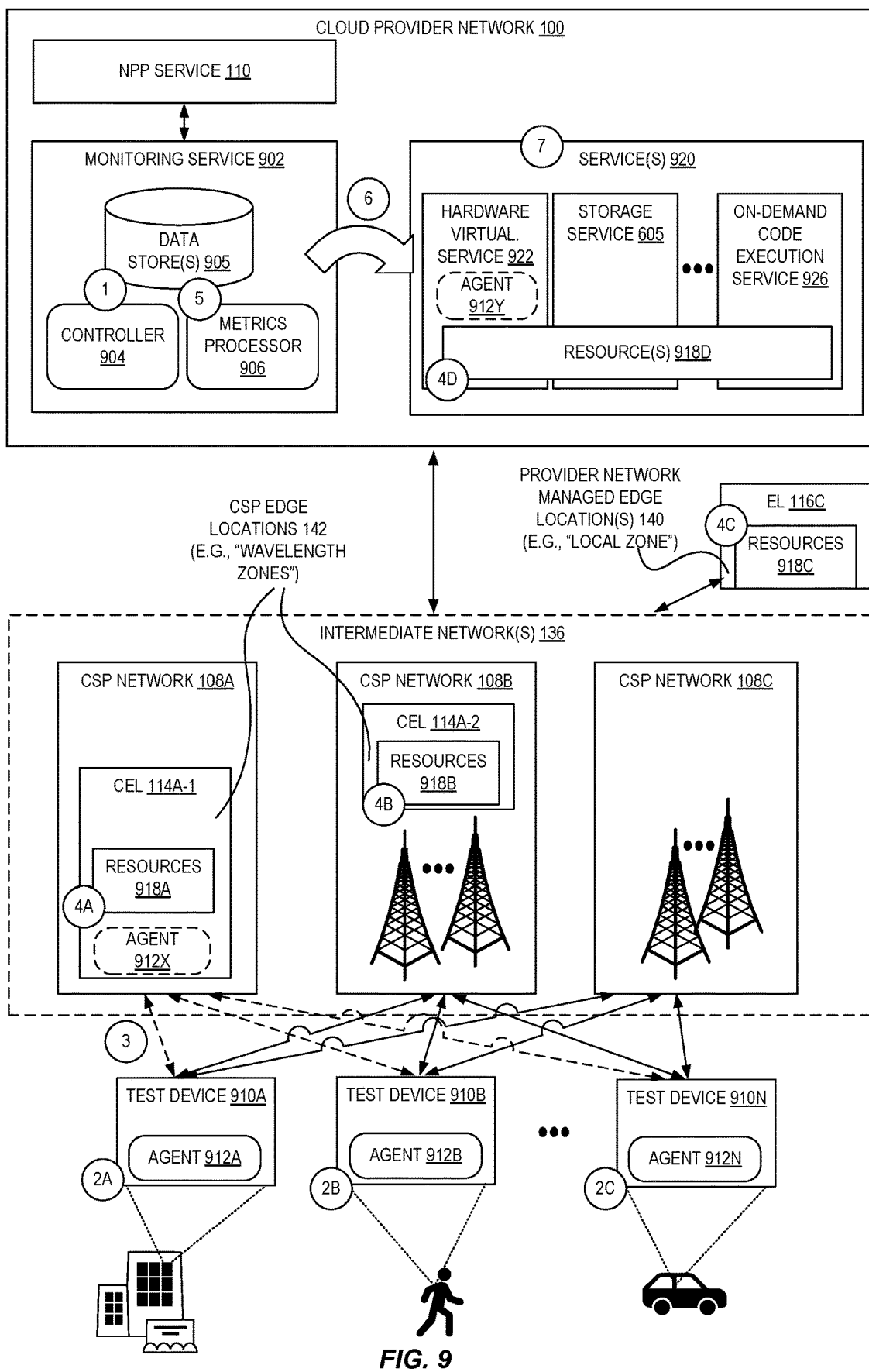
FIG. 9 is a diagram illustrating an environment for distributed network connectivity monitoring of provider network edge location resources from cellular networks according to some examples.

For example, FIG. 9 is a diagram illustrating an environment for distributed network connectivity monitoring of provider network edge location resources from cellular networks according to some examples. In FIG. 9, a monitoring service 902 of a provider network 100 includes a controller 904, a metrics processor 906, and one or more data stores 905. Some or all of monitoring service 902 may be implemented using software executed by one or multiple computing devices across one or multiple locations and may utilize other services 920 of the provider network 100. For example, the controller 904 and/or metrics processor 906 may be implemented as a software application that is executed by one or more compute instances provided by a hardware virtualization service 922 or on-demand code execution service 926, for example, and make use of one or more data stores 905 provided by a storage service 924 (e.g., providing block-level storage or object storage) or a database service.

The controller 904 may function to provide functionalities ranging from managing test infrastructure, assigning work to testing agents, and providing information pertaining to the state of tests, devices, locations, etc., to other systems or users. As shown at circle (1), the controller 904 may act as coordinator to allow for the configuration of a set of agents to perform testing.

For example, in some examples, the controller 904 may manage a registry of agents 912 available for performing testing as well as resources 918 that are to be tested. For example, the monitoring service 902 may provide one or more APIs for the registration of one or both of agents 912 and/or resources 918. As one example, in some examples the monitoring service 902 provides a device registration API (e.g., a "RegisterDevice" method) allowing clients to add a new agent 912 (or, test device 910) or in some examples a resource to be targeted/tested into the system. Thus, in some examples, both an agent and a targeted resource (e.g., a compute instance or other server) may be represented as devices, where the agent has a role of "client" of the service and a targeted resource has a role of "target" of the service. Data associated with the device, e.g., a device type, network address, location, role, etc., may be stored by the controller 904 in the data store(s) 905.

Further, at circle (1), the monitoring service 902 may also provide APIs to explicitly define a collection of agents and/or targets referred to as a "node," by sending an API request (e.g., "CreateNode") to define a node including zero, one, or multiple agents and/or targets by providing device identifiers to below to the node, or characteristics of devices that are to be added to the node. A node may thus include a set of agents of a particular type, or a set of agents located in a particular area. A node may similarly include a set of targets of a particular type, etc.

In some examples, the monitoring service 902 may provide one or more APIs allowing a client to define a "test suite" of tests to be performed by one or more agents against one or multiple targets. For example, the monitoring service 902 may provide an API (e.g., "CreateTestSuite" method) allowing a client to first generate a test suite (e.g., with example data such as one or more of a test suite identifier, a human-readable name or description, an identifier of an associated user or account) and then an API (e.g., "AddCommandsToTestSuite" or "AddCommandsToDevice" method) allowing the client to define one or more commands to be performed as part of the test suite.

A command may directly or indirectly correspond to a particular test type, program, utility, etc. For example, a command may be to perform a "ping" (e.g., a Transmission Control Protocol (TCP) ping or ICMP echo-based ping technique) test that sends packets of data to a specific network address to determine how long it took to transmit the data and get a response. Thus, a command of "ICMP-PING" used in an API call may correspond to an ICMP ping test, while a command of "TCPPING" may correspond to a TCP ping test, and each command may have zero, one, or more arguments provided therewith.

As another example, a command may be to perform a "traceroute" (e.g., via a traceroute, tracepath, or tracert command available in various operating systems) determine a "path" that packets take from one entity to another, resulting in data such as the hostname of each traversed device, its network address (e.g., IP address), its response time, etc. However, many other types of commands may be implemented in various examples, such as a known network tests for determining throughput, packet loss, packet jitter, etc., while running different kinds of workloads (e.g., bidirectional video streaming over different protocols, file transfers, iperf, etc.) over various protocols (e.g., TCP and UDP). For example, the commands could be to send a request to a server to download a file, send a request to upload a file, send a request to stream media, send a request to a server to perform a particular task, or the like. A command could also be to execute a resource, which could be a user-provided resource (e.g., in the form of code, a compiled application, a container, a virtual machine, or the like).

In some examples, each command identifies one or more target resources, and thus different commands may have potentially different targets. However, in some examples, each command in the test suite is implicitly associated with one or more target resources that are directly associated with an entire test suite; thus, it may be the case that each command is run for each test suite-associated target.

Similarly, in some examples each command may have an associated network identifier indicating what specific network or type of network (or network interface) the device is to use for the test, e.g., a particular cellular communications network, all device-available cellular communications networks, a wired network interface, a wireless local area network (WLAN) interface, etc. However, in some examples the entire test suite may be associated with one or more networks, types of networks, or interfaces, and thus all commands will be performed using one or multiple networks, network types, network interfaces, etc.

In some examples, the monitoring service 902 may provide one or more APIs (e.g., a "PublishTestConfig" method) allowing the client to publish a "test suite" of tests to one or more agents to be performed. Such a request may include data that identifies a test suite (e.g., via an identifier or name of a test suite returned from a previous CreateTestSuite type call), optionally identifies one more targets for the test, optionally specifies a job execution frequency (e.g., run one time, run every X minutes, run according to a defined schedule, or the like). Upon receipt of such a PublishTestConfig type call, the controller 904 may cause a data structure for the test suite (e.g., a "test configuration") to be transmitted to the one or more agents 912 associated with the test suite. This transmission may be instantaneous, such as when the controller 904 has an available connection to the agents, or near instantaneous, such as when an agent next performs a "heartbeat" type check-in with the controller 904 as described later herein.

As shown at circles (2A), (2B), and (2C), a same or different test configuration may be transmitted to various agents 912A-912N as shown here, though potentially other agents (e.g., agent 912X, agent 912Y, etc.). Each recipient agent 912 may persist the test configuration, optionally overwriting any previous version of the test configuration, and perform the indicated commands according to a schedule (e.g., which may be indicated by the test configuration itself). For example, the agent may perform the commands every minute, every five minutes, every hour, every day, etc.

As part of the testing, the agents 912 may transmit data using one or multiple different networks, which may be wireless "cellular" type networks (e.g., via a cellular-enabled interface to one or more communication service provider (CSP) networks 108B-108C provided by one or more CSPs), other types of wireless or wired networks (e.g., via a WLAN (e.g., WiFi) interface or ethernet type interface to a network provided by a CSP network 108A, such as those used in local networks coupled to coaxial cable networks, fiber-optic networks, telephone cable networks (e.g., Digital Subscriber Line (DSL)), or other physical networks provided by ISPs, for example.

Thus, at circle (3), the agent(s) 912 of the test device(s) 910 may perform the commands specified by the test configuration—e.g., ping tests, download tests, trace route tests—to interact with the associated resources. As indicated throughout, beneficially the agents 912 may interact with resources 918A-918B that may be deployed within a CSP network 108A-108B edge location 114A-114B at circles (4A) or (4B), which may potentially only be available (or may be available at a comparatively lower latency) to subscribers of that particular CSP using the network resources (e.g., physical access networks, cell towers, etc.) of that CSP. Additionally, or alternatively, the agents 912 may interact with other resources 918 such as resources 918C at circle (4C) in a local zone (provider network-managed edge location 114B) edge location 114C, and/or resources 918D provided within a region of the provider network 100 itself at circle (4D), which may be provided by one or more services. As another example, one set of commands could be to interact with different compute instances of a same application hosted in various edge locations 114A-116C and/or in the provider network 100 itself to determine the different characteristics of these locations.

The agents 912 may collect the results of the commands as raw metric data, which may include the output from each of the applications or tools used to perform the commands. For example, the output from a ping utility used to ping a first resource may be saved, and the output from a traceroute utility used to trace the route to a second resource may also be saved. The outputs from each command may be saved as individual data structures or files or may be consolidated together into a single data structure/file. These outputs may include a variety of types of network-related metric data, such as whether a targeted resource was reachable/responsive, latency values measured between the test device and a resource, etc. Optionally, the agent may supplement this information with additional metadata, such as a wireless signal strength observed by the test device at the time of the command(s), geocoordinate information describing a location of the test device at the time of the execution of the command(s), a date and/or time (e.g., a timestamp) from the time of the execution of the command(s), etc.

In some examples, this data resulting from the execution of a test configuration may be immediately transmitted by the agent 912 to the monitoring service 902 (or another service 920 of the provider network 100, such as to a storage location of the storage service 705, to a stream of a data stream service, or the like, allowing the monitoring service 902 to obtain the data from it), though in other examples the agent 912 may send this information, from perhaps multiple executions of one or more test configurations, in a batch. Such a batch transmission may occur according to a schedule (e.g., every hour) or based on another event, such as the agent 912 determining it has entered a particular location, has a particular network available to it, has a threshold number of results to return, etc. This data may optionally be stored in the data store(s) 105, and at circle (5), the metrics processor 906 may obtain the data and process it, e.g., by transforming it into other formats useful by other services or users. For example, the metrics processor 906 may aggregate and emit metrics, such as the average latency observed to a particular resource across multiple test configuration executions from one or multiple agents; this data may be provided to another service or to a user/account associated with the resource. As yet another example, this data may be provided to the NPP service 110 as described herein for use in generating mobile network performance predictions.

As another example, the metrics processor 906 may detect potential issues, e.g., by determining whether any individual resources are not responsive, or whether a latency (e.g., an average latency) associated with a resource exceeds a threshold or is otherwise anomalous, etc., and notify one or more other services or users/accounts. As another example, the metrics processor 906 may determine that a threshold number of resources within a particular location (e.g., in a same edge location) are non-responsive or have latencies that deviate from their typical latencies (or pass a threshold latency) and notify another service or user/account. Similarly, in some examples the metrics processor may monitor characteristics of received or non-received heartbeat messages (as described further herein) transmitted by test devices to determine characteristics of various communications networks, e.g., the absence of heartbeat messages arriving via a first communications network may indicate that the network is not operating properly.

As another example, the metrics processor 906 may generate metrics pertaining to connectivity latencies between agents and particular target resource locations and provide these metrics (at circle (6)) to a resource placement component of a service that decides where to place new resources based on performance. For example, the metrics processor 906 may be able to determine current average latencies from clients within a particular city or region to a first edge location, from those clients within the particular city or region to a second edge location, from clients within the particular city or region to a location within the provider network, etc., and provide this data to the other placement service.

Thereafter, a user of the provider network 100 may be able to specify desired placement characteristics for a user's resources (e.g., a compute instance, container, application/code, etc.)—such as that the user desires the resources to be placed in CSP edge locations 114A within a particular geographic area (e.g., a metro area surrounding a major city) that can provide connectivity to users in that geographic area at less than a maximum latency. As another example, the user may wish to place some resources within a threshold amount of latency (e.g., within 20 ms) from a geographic location (e.g., downtown Seattle, Washington). The service may thus be able to use the metrics provided by the monitoring service 902 to identify these locations for placement and may cause the placement of the user's resources accordingly (or, provide recommendations to the user as to where to place the resources) at circle (7).

As another example, the metrics processor 906 may generate metrics pertaining to connectivity latencies between particular geographic locations (of agents) and particular target resource locations and provide these metrics (at circle (6)) to a routing component of a service that provides "routing" information for clients in using to connect to a resource when multiple resources exist. By way of example, a client electronic device executing an application may send a request to a backend service seeking a network address for a resource it can use during execution of the application; the backend service can use the latency metrics to identify, from geolocation data provided by the client (or inferred for the client, such as by analyzing the network address of the client), a particular resource located "closest" (from a network latency perspective) to the client, which can be returned to the client at circle (7).

As another example, the metrics processor 906 may generate metrics pertaining to signal strength of various cellular networks at various locations at different points in time, which can be useful, e.g., for determining where to install additional access points, for creating routes (e.g., for vehicles or devices) that avoid "dead" spots where no network connectivity exists, etc.

As another example, the metrics processor 906 may generate metrics pertaining to the network performance/connectivity of resources and publish metrics to a separate event monitoring service (e.g., AWS CloudWatch), which may be configured with alarms that may be triggered upon particular metrics passing particular thresholds or having a particular value, for example.

As described herein, examples can beneficially be used to test network characteristics (e.g., latency, reachability, etc.) of resources provided in edge locations, which in some cases may not be accessible to other systems on the Internet and may instead only be made accessible to users of a CSP, for example.

Figure 10:
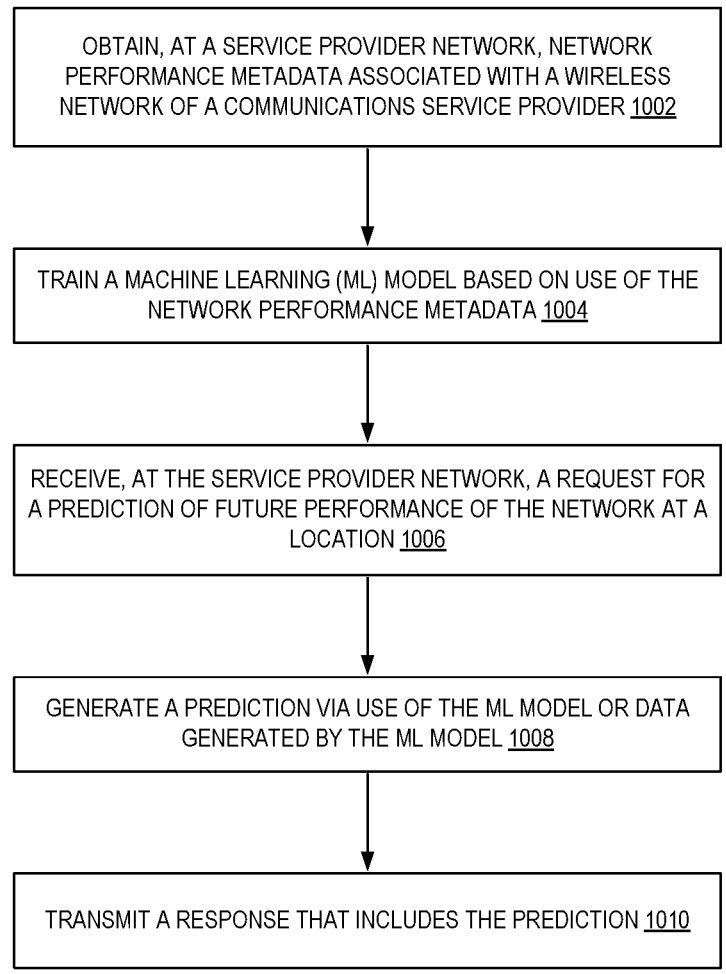
FIG. 10 is a flow diagram illustrating operations of a method for providing mobile network performance visibility according to some examples.

FIG. 10 is a flow diagram illustrating operations 1000 of a method for providing mobile network performance visibility according to some examples. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1000 are performed by the NPP service 110 of the other figures.

The operations 1000 include, at block 1002, obtaining, at a cloud provider network, network performance metadata associated with a network of a communications service provider. In some examples, at least some of the network performance metadata is obtained at least in part via network tests performed by electronic devices interacting with the network. In some examples, the network is a "mobile" network that provides wireless network access, such as a cellular network (e.g., 4G, 5G), Wi-Fi, etc.

The operations 1000 further include, at block 1004, training a machine learning (ML) model based on use of the network performance metadata.

In some examples, block 1002 includes receiving, at the cloud provider network, the network performance metadata from a component of the network and storing the network performance metadata with existing network performance metadata in a data lake; and the training of block 1004 is based on the network performance metadata and the existing network performance metadata in the data lake.

In some examples, the operations 1000 further include generating, via use of the ML model, a forecast of predicted future performance of the wireless network at the location, wherein generating the prediction occurs via use of the forecast as the data generated by the ML model.

The operations 1000 further include, at block 1006, receiving, at the cloud provider network, a request for a prediction of future performance of the wireless network at a location.

The operations 1000 further include, at block 1008, generating a prediction via use of the ML model or data generated by the ML model.

In some examples, the prediction of future performance sought by the request comprises one of: an amount of predicted latency between the wireless network and clients of the wireless network at or near the location at one or more points of time; an amount of predicted bandwidth available via the wireless network for clients of the wireless network at or near the location at one or more points of time; or an amount of predicted jitter for clients of the wireless network at or near the location at one or more points of time.

In some examples, the prediction of future performance sought by the request comprises one of: a predicted connection reliability value associated with the wireless network at or near the location at one or more points of time; or a predicted likelihood of obtaining a type or class of wireless service, via the wireless network, at or near the location at one or more points in time.

In some examples, the operations 1000 further include obtaining, from the communications service provider, one or more rules to be used during generation of predictions of future performance; and evaluating the one or more rules as part of the generating of the prediction. In some examples, evaluating the one or more rules as part of the generating of the prediction includes modifying a preliminary prediction generated, via use of the ML model or the data generated by the ML model, to yield the prediction. In some examples, evaluating the one or more rules as part of the generating of the prediction includes determining to send a message to the communications service provider, and wherein the method further comprises transmitting the message to the communications service provider. In some examples, the message transmitted to the communications service provider indicates a request to obtain or reserve a connectivity resource for a user equipment (UE) device or an account of the communications service provider associated with a user.

The operations 1000 further include, at block 1010, transmitting a response that includes the prediction. In some examples, the request was originated by, and the response is destined to, a user equipment (UE) device located at or near the location and that utilizes the wireless network of the communications service provider. In some examples, the request was originated by, and the response was destined to, a component of an application deployed at least in part in the cloud provider network or within a cloud edge location of the cloud provider network. In some examples, based on the prediction, the application modifies its functioning or delivery of service to one or more UE devices via the network. In some examples, the operations 1000 further include: receiving a request to deploy an instance associated with the application at the cloud edge location or at a second cloud edge location of the cloud provider network; and causing the instance to be deployed at the cloud edge location or at the second cloud edge location.

Figure 11:
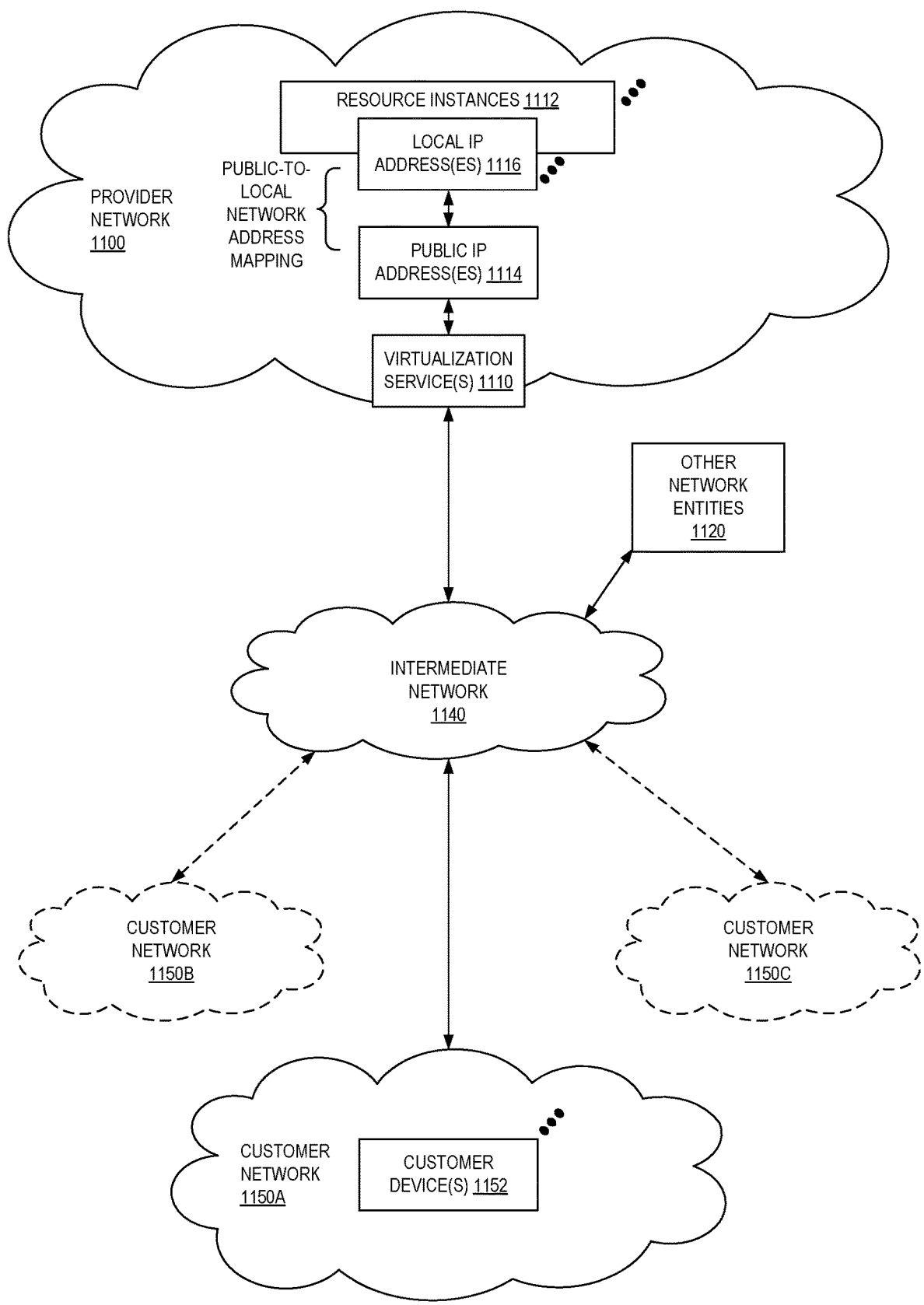
FIG. 11 illustrates an example provider network environment according to some examples.

FIG. 11 illustrates an example provider network (or "service provider system") environment according to some examples. A provider network 1100 can provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 can be associated with the resource instances 1112; the local IP addresses are the internal network addresses of the resource instances 1112 on the provider network 1100. In some examples, the provider network 1100 can also provide public IP addresses 1114 and/or public IP address ranges (e.g., Internet Protocol version 4 (IPv4) or Internet Protocol version 6 (IPv6) addresses) that customers can obtain from the provider 1100.

Conventionally, the provider network 1100, via the virtualization services 1110, can allow a customer of the service provider (e.g., a customer that operates one or more customer networks 1150A-1150C (or "client networks") including one or more customer device(s) 1152) to dynamically associate at least some public IP addresses 1114 assigned or allocated to the customer with particular resource instances 1112 assigned to the customer. The provider network 1100 can also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 can be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1100; a customer can then assign their allocated public IP addresses to particular resource instances allocated to the customer. These public IP addresses can be referred to as customer public IP addresses, or simply customer IP addresses. Instead of being assigned by the provider network 1100 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
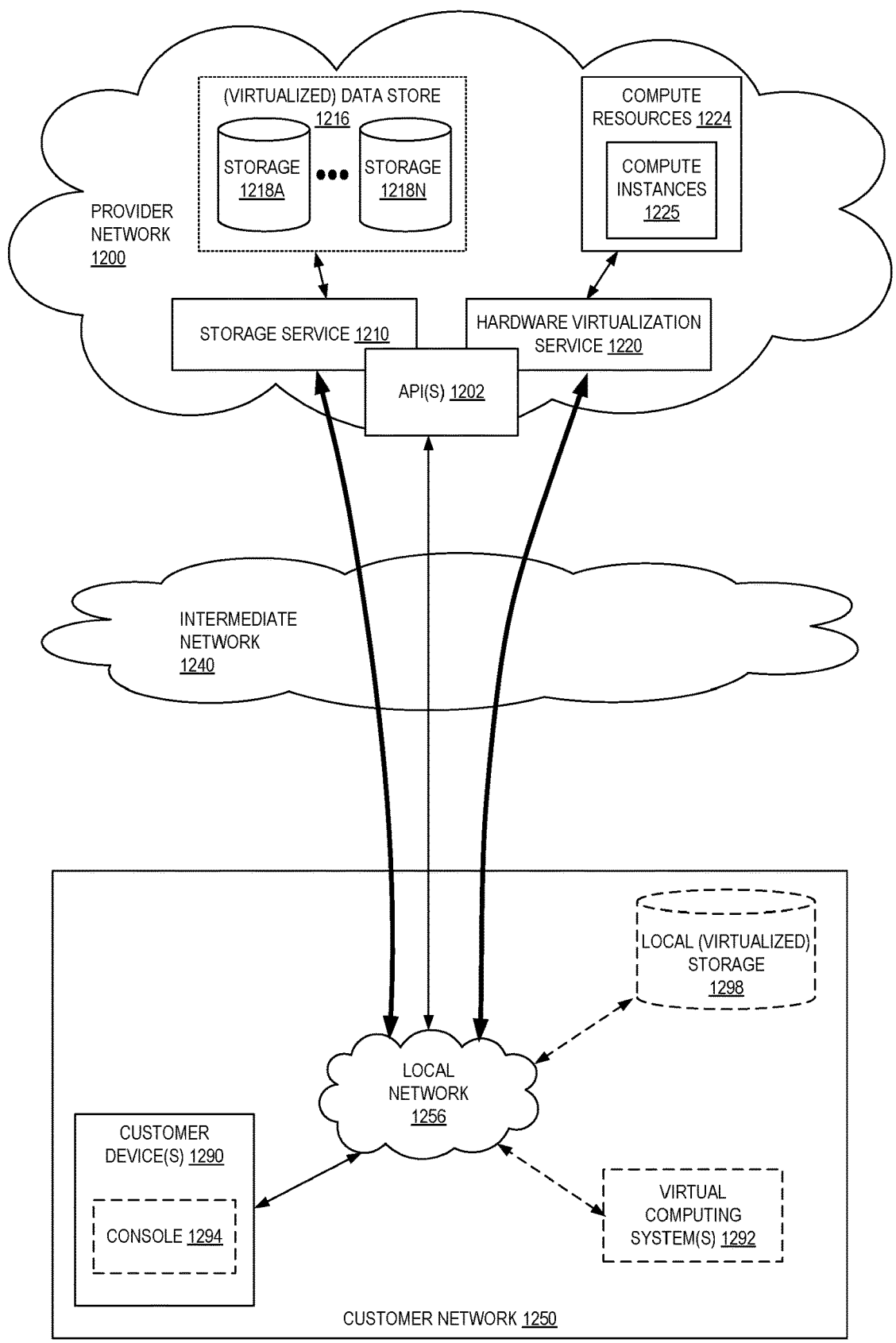
FIG. 12 is a block diagram of an example provider network that provides a storage service and a hardware virtualization service to customers according to some examples.

FIG. 12 is a block diagram of an example provider network environment that provides a storage service and a hardware virtualization service to customers, according to some examples. A hardware virtualization service 1220 provides multiple compute resources 1224 (e.g., compute instances 1225, such as VMs) to customers. The compute resources 1224 can, for example, be provided as a service to customers of a provider network 1200 (e.g., to a customer that implements a customer network 1250). Each computation resource 1224 can be provided with one or more local IP addresses. The provider network 1200 can be configured to route packets from the local IP addresses of the compute resources 1224 to public Internet destinations, and from public Internet sources to the local IP addresses of the compute resources 1224.

The provider network 1200 can provide the customer network 1250, for example coupled to an intermediate network 1240 via a local network 1256, the ability to implement virtual computing systems 1292 via the hardware virtualization service 1220 coupled to the intermediate network 1240 and to the provider network 1200. In some examples, the hardware virtualization service 1220 can provide one or more APIs 1202, for example a web services interface, via which the customer network 1250 can access functionality provided by the hardware virtualization service 1220, for example via a console 1294 (e.g., a web-based application, standalone application, mobile application, etc.) of a customer device 1290. In some examples, at the provider network 1200, each virtual computing system 1292 at the customer network 1250 can correspond to a computation resource 1224 that is leased, rented, or otherwise provided to the customer network 1250.

From an instance of the virtual computing system(s) 1292 and/or another customer device 1290 (e.g., via console 1294), the customer can access the functionality of a storage service 1210, for example via the one or more APIs 1202, to access data from and store data to storage resources 1218A-1218N of a virtual data store 1216 (e.g., a folder or "bucket," a virtualized volume, a database, etc.) provided by the provider network 1200. In some examples, a virtualized data store gateway (not shown) can be provided at the customer network 1250 that can locally cache at least some data, for example frequently accessed or critical data, and that can communicate with the storage service 1210 via one or more communications channels to upload new or modified data from a local cache so that the primary store of data (the virtualized data store 1216) is maintained. In some examples, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

While not shown in FIG. 12, the virtualization service(s) can also be accessed from resource instances within the provider network 1200 via the API(s) 1202. For example, a customer, appliance service provider, or other entity can access a virtualization service from within a respective virtual network on the provider network 1200 via the API(s) 1202 to request allocation of one or more resource instances within the virtual network or within another virtual network.

Illustrative Systems

Figure 13:
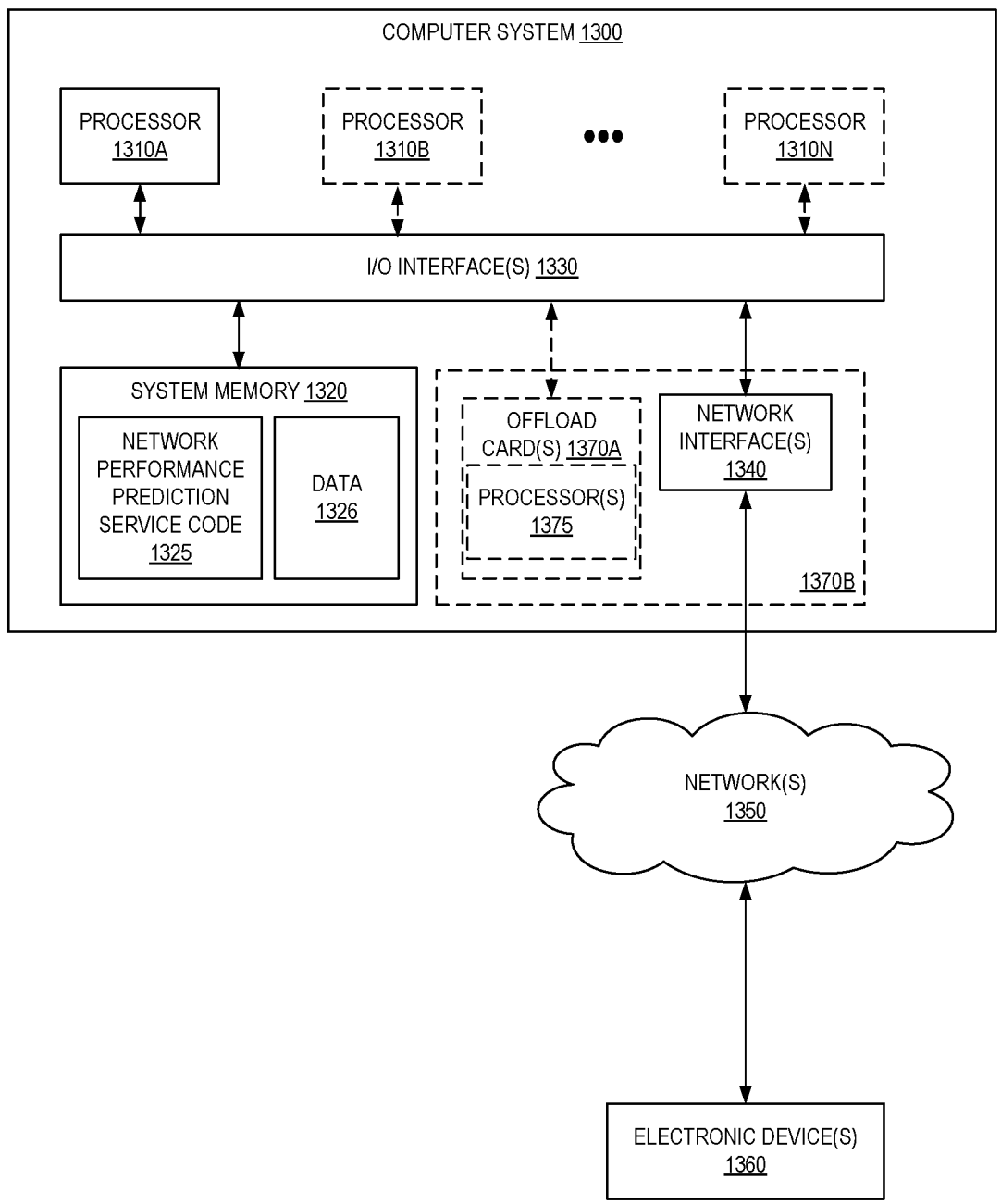
FIG. 13 is a block diagram illustrating an example computer system that can be used in some examples.

In some examples, a system that implements a portion or all of the techniques described herein can include a general-purpose computer system, such as the computer system 1300 illustrated in FIG. 13, that includes, or is configured to access, one or more computer-accessible media. In the illustrated example, the computer system 1300 includes one or more processors 1310 coupled to a system memory 1320 via an input/output (I/O) interface 1330. The computer system 1300 further includes a network interface 1340 coupled to the I/O interface 1330. While FIG. 13 shows the computer system 1300 as a single computing device, in various examples the computer system 1300 can include one computing device or any number of computing devices configured to work together as a single computer system 1300.

In various examples, the computer system 1300 can be a uniprocessor system including one processor 1310, or a multiprocessor system including several processors 1310 (e.g., two, four, eight, or another suitable number). The processor(s) 1310 can be any suitable processor(s) capable of executing instructions. For example, in various examples, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various examples, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1320 as network performance prediction service code 1325 (e.g., executable to implement, in whole or in part, the network performance prediction service 110) and data 1326.

In some examples, the I/O interface 1330 can be configured to coordinate I/O traffic between the processor 1310, the system memory 1320, and any peripheral devices in the device, including the network interface 1340 and/or other peripheral interfaces (not shown). In some examples, the I/O interface 1330 can perform any necessary protocol, timing, or other data transformations to convert data signals from one component (e.g., the system memory 1320) into a format suitable for use by another component (e.g., the processor 1310). In some examples, the I/O interface 1330 can include support for devices attached through various types of peripheral buses, such as a variant of the Peripheral Component Interconnect (PCI) bus standard or the Universal Serial Bus (USB) standard, for example. In some examples, the function of the I/O interface 1330 can be split into two or more separate components, such as a north bridge and a south bridge, for example. Also, in some examples, some or all of the functionality of the I/O interface 1330, such as an interface to the system memory 1320, can be incorporated directly into the processor 1310.

The network interface 1340 can be configured to allow data to be exchanged between the computer system 1300 and other devices 1360 attached to a network or networks 1350, such as other computer systems or devices as illustrated in FIG. 1, for example. In various examples, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1300 can act as a host electronic device (e.g., operating as part of a hardware virtualization service) that hosts compute resources such as compute instances, and the one or more offload cards 1370A or 1370B execute a virtualization manager that can manage compute instances that execute on the host electronic device. As an example, in some examples the offload card(s) 1370A or 1370B can perform compute instance management operations, such as pausing and/or un-pausing compute instances, launching and/or terminating compute instances, performing memory transfer/copying operations, etc. These management operations can, in some examples, be performed by the offload card(s) 1370A or 1370B in coordination with a hypervisor (e.g., upon a request from a hypervisor) that is executed by the other processors 1310A-1310N of the computer system 1300. However, in some examples the virtualization manager implemented by the offload card(s) 1370A or 1370B can accommodate requests from other entities (e.g., from compute instances themselves), and can not coordinate with (or service) any separate hypervisor.

In some examples, the system memory 1320 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1218A-1218N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
    obtaining, at a cloud provider network, wireless network performance metadata associated with a cellular network of a communications service provider, wherein the wireless network performance metadata includes at least one of:
        latency between the cellular network and clients of the cellular network;
        bandwidth available or utilized via the cellular network for clients of the cellular network; or
        jitter for clients of the cellular network;
    storing the wireless network performance metadata at one or more storage locations of an object storage service of the cloud provider network;
    training at least a machine learning (ML) model based at least in part on use of the wireless network performance metadata;
    generating one or more forecasts based at least in part on use of the ML model;
    receiving, at the cloud provider network via an Application Programming Interface (API), a request for a prediction of future performance of the cellular network at a location, the request identifying a plurality of cells of the cellular network that are visible at the location;
    generating the prediction of future performance of the cellular network at individual ones of the plurality of cells via use of at least one of the one or more forecasts;
    transmitting a response to the request that includes the prediction for the individual ones of the plurality of cells, the response including at least one of: a respective predicted latency, a respective predicted bandwidth, or a respective predicted jitter for the individual ones of the plurality of cells; and
    based at least in part on the prediction of the future performance of the cellular network at the location, transmitting from the cloud provider network a message to the communications service provider to obtain, reserve, or configure a connectivity resource of the communications service provider at a particular cell of the plurality of cells for a particular user equipment (UE) device or an account of the communications service provider associated with a particular user.

2. The computer-implemented method of claim 1, wherein the prediction of future performance sought by the request comprises one of:
    a respective predicted connection reliability value associated with the cellular network from the individual ones of the plurality of cells at one or more points of time; or
    a respective predicted likelihood of obtaining a type or class of cellular service, via the cellular network, from the individual ones of the plurality of cells at one or more points in time.

3. The computer-implemented method of claim 1, wherein the request further identifies a desired type of network slice, and the response indicates whether the desired type of network slice is available at the location.

4. A computer-implemented method comprising:
obtaining, at a cloud provider network, network performance metadata associated with a wireless network of a communications service provider;
training a machine learning (ML) model based at least in part on use of the network performance metadata;
receiving, at the cloud provider network, a request for a prediction of future performance of the wireless network at a location, the request identifying a plurality of cells of the wireless network that are visible at the location;
generating the prediction of future performance of the wireless network at individual ones of the plurality of cells via use of the ML model or data generated by the ML model; and
transmitting a response that includes the prediction for the individual ones of the plurality of cells, the response including at least one of: a respective predicted latency, a respective predicted bandwidth, or a respective predicted jitter for the individual ones of the plurality of cells.

5. The computer-implemented method of claim 4, wherein:
obtaining the network performance metadata comprises:
receiving, at the cloud provider network, the network performance metadata from a component of the wireless network, and
storing the network performance metadata with existing network performance metadata; and
training the ML model occurs based at least in part on the network performance metadata and the existing network performance metadata.

6. The computer-implemented method of claim 4, wherein the request was originated by, and the response is destined to, a user equipment (UE) device located at or near the location and that utilizes the wireless network of the communications service provider.

7. The computer-implemented method of claim 4, wherein the request was originated by, and the response was destined to, a component of an application deployed at least in part in the cloud provider network or within a cloud edge location of the cloud provider network, and wherein, based at least in part on the prediction, the application modifies a functioning of the application or a delivery of data provided by the application.

8. The computer-implemented method of claim 4, wherein the prediction of future performance sought by the request is a numeric, binary, or categorical value.

9. The computer-implemented method of claim 4, wherein the prediction of future performance sought by the request is a numeric, binary, or categorical value and comprises one of:
a respective predicted connection reliability value associated with the wireless network from the individual ones of the plurality of cellsat one or more points of time; or
a respective predicted likelihood of obtaining a type or class of wireless service, via the wireless network, from the individual ones of the plurality of cells at one or more points in time.

10. The computer-implemented method of claim 4, further comprising:
generating, via use of the ML model, a forecast of predicted future performance of the wireless network at the location,
wherein generating the prediction occurs via use of the forecast as the data generated by the ML model.

11. The computer-implemented method of claim 4, wherein at least some of the network performance metadata is obtained at least in part via network tests performed by electronic devices interacting with the wireless network.

12. The computer-implemented method of claim 4, further comprising:
obtaining, from the communications service provider, one or more rules to be used during generation of predictions of future performance; and
evaluating the one or more rules as part of the generating of the prediction.

13. The computer-implemented method of claim 12, wherein evaluating the one or more rules as part of the generating of the prediction includes modifying a preliminary prediction generated, via use of the ML model or the data generated by the ML model, to yield the prediction.

14. The computer-implemented method of claim 12, wherein evaluating the one or more rules as part of the generating of the prediction includes determining to send a message to the communications service provider, and wherein the method further comprises transmitting the message to the communications service provider.

15. A system comprising:
a first one or more electronic devices to implement a storage service in a multi-tenant cloud provider network, the storage service to store network performance metadata, associated with a wireless network of a communications service provider, that was obtained at least in part from the communications service provider; and
a second one or more electronic devices to implement a network performance prediction (NPP) service in the multi-tenant cloud provider network, the NPP service including instructions that upon execution cause the NPP service to:
train a machine learning (ML) model based at least in part on use of the network performance metadata stored by the storage service;
receive a request for a prediction of future performance of the wireless network at a location, the request identifying a plurality of cells of the wireless network that are visible at the location;
generate a prediction of future performance of the wireless network at individual ones of the plurality of cells via use of the ML model or data generated by the ML model;
transmit a response that includes the prediction for the individual ones of the plurality of cells, the response including at least one of: a respective predicted latency, a respective predicted bandwidth, or a respective predicted jitter for the individual ones of the plurality of cells; and
based at least in part on the prediction, transmitting from the multi-tenant cloud provider network a message to the communications service provider to obtain, reserve, or configure a connectivity resource of the communications service provider for a particular user equipment (UE) device or an account of the communications service provider associated with a particular user.

16. The system of claim 15, wherein the request was originated by, and the response is destined to, a user equipment (UE) device located at or near the location and that utilizes the network of the communications service provider.

17. The system of claim 15, wherein:
the request was originated by, and the response was destined to, a component of an application deployed at least in part in the cloud provider network or within a cloud edge location of the cloud provider network; and
based at least in part on the prediction, the application modifies a functioning of the application or a delivery of data provided by the application.

18. The system of claim 15, wherein the prediction of future performance sought by the request is a numeric, binary, or categorical value.

19. The system of claim 15, wherein the prediction of future performance sought by the request is a numeric, binary, or categorical value and comprises one of:
a respective predicted connection reliability value associated with the wireless network from the individual ones of the plurality of cells at one or more points of time; or
a respective predicted likelihood of obtaining a type or class of wireless service, via the wireless network, from the individual ones of the plurality of cells at one or more points in time.

20. The system of claim 15, wherein at least some of the network performance metadata is obtained at least in part via network tests performed by a third one or more electronic devices interacting with the wireless network.

* * * * *